United States Patent
Asao et al.

(10) Patent No.: US 8,978,565 B2
(45) Date of Patent: Mar. 17, 2015

(54) TWO-NEEDLE SEWING MACHINE AND TWO-NEEDLE SEWING MACHINE STITCH FORMING METHOD

(75) Inventors: Hideo Asao, Chofu (JP); Nobuhiro Nishi, Chofu (JP)

(73) Assignees: Midori Anzen Hougi Co., Ltd., Chofu-Shi, Tokyo (JP); Midori Anzen Co., Ltd., Shibuya-Ku, Tokyo (JP)

( * ) Notice: Subject to any disclaimer, the term of this patent is extended or adjusted under 35 U.S.C. 154(b) by 280 days.

(21) Appl. No.: 13/702,707

(22) PCT Filed: Dec. 27, 2010

(86) PCT No.: PCT/JP2010/073504
§ 371 (c)(1),
(2), (4) Date: Dec. 7, 2012

(87) PCT Pub. No.: WO2011/155091
PCT Pub. Date: Dec. 15, 2011

(65) Prior Publication Data
US 2013/0081563 A1 Apr. 4, 2013

(30) Foreign Application Priority Data
Jun. 10, 2010 (JP) ................. 2010-132847

(51) Int. Cl.
*D05B 1/06* (2006.01)
*D05B 1/10* (2006.01)
*D05B 3/02* (2006.01)
*D05B 15/00* (2006.01)
*D05B 55/10* (2006.01)
*B60N 2/58* (2006.01)

(52) U.S. Cl.
CPC *D05B 1/10* (2013.01); *D05B 3/025* (2013.01); *D05B 15/00* (2013.01); *D05B 55/10* (2013.01); *B60N 2/5891* (2013.01)
USPC ..................................... 112/163

(58) Field of Classification Search
USPC ............. 112/166, 98, 99, 100, 101, 163, 165, 112/197, 199, 201, 220, 222, 475.01, 112/475.07, 475.17
See application file for complete search history.

(56) References Cited

U.S. PATENT DOCUMENTS

| 2,292,724 A | * | 8/1942 | Thompson et al. | ........... 112/197 |
| 2,973,730 A | * | 3/1961 | Neill et al. | ................. 112/162 |
| 3,919,942 A | * | 11/1975 | Galya et al. | ................. 112/166 |
| 4,513,673 A | * | 4/1985 | Brusasca et al. | ............ 112/166 |
| 5,676,077 A | * | 10/1997 | Landoni | ................. 112/475.01 |

FOREIGN PATENT DOCUMENTS

| JP | 52-10527 U | 1/1977 |
| JP | 2005-118400 | 5/2005 |
| WO | WO 2009/113337 A1 | 9/2009 |

OTHER PUBLICATIONS

International Search Report (PCT/ISA/210) issued on Feb. 1, 2011, by the Japanese Patent Office as the International Searching Authority for International Application No. PCT/JP2010/073504.

* cited by examiner

*Primary Examiner* — Tejash Patel
(74) *Attorney, Agent, or Firm* — Buchanan Ingersoll & Rooney PC

(57) ABSTRACT

Disclosed is a two-needle sewing machine that improves strength in a convex curve part by bringing a pair of stitches close together when sewing an item. A two-needle sewing machine includes a bed part; a column part; an arm part; a needle shaft that is disposed on the leading part of the arm part; two sewing needles that are attached to the needle shaft; two horizontal hooks that catch the respective needle thread loops of the two sewing needles; and a conveyor member that conveys a material to be sewn in a direction approximately orthogonal to the bed part. On the two-needle sewing machine, the sewing needle, which is positioned in a location distant from the column part, is disposed closer to the conveyance side of the material to be sewn than the sewing needle that is positioned in a location closer to the column part.

3 Claims, 28 Drawing Sheets

TWO-NEEDLE SEWING MACHINE AND TWO-NEEDLE SEWING MACHINE STITCH FORMING METHOD

TECHNICAL FIELD

The present invention relates to a two-needle sewing machine in which two stitches are formed in materials to be sewn such as a cloth, leather, and the like by reciprocating two sewing needles, and a method for forming a stitch by the two-needle sewing machine.

BACKGROUND ART

In the conventional art, a two-needle sewing machine includes a bed part on which materials to be sewn such as a cloth, leather, and the like are placed, a column part erected upward from one side (right side) of the bed part, and an arm part provided to be substantially parallel to the bed part from an upper part of the column part. A needle shaft that reciprocates vertically by a driving motor (not illustrated) provided at a leading part (left part) of the arm part. Two sewing needles are mounted on the needle shaft. The bed part includes two horizontal hooks by which loops of needle threads of two sewing needles are caught, and a conveyor member conveying the materials to be sewn such as the cloth, the leather, and the like substantially in a direction orthogonal to the bed part.

The conventional two-needle sewing machine closely forms two stitches by two sewing needles. As illustrated in FIG. 26, two sewing needles 91 and 92 are arranged in a conveyance direction T of a material to be sewn 30 at a predetermined interval for the purpose of acquiring robust sewing, and a stitch 95A formed by a sewing needle 91 and a stitch 96A formed by a sewing needle 92 are brought into close contact to each other (for example, Patent document 1 and 2).

PRIOR ART DOCUMENTS

Patent Documents

Patent document 1: Utility Model Publication No. 52-10527
Patent document 2: U.S. Pat. No. 4,456,846

SUMMARY OF THE INVENTION

Problem to be Solved by the Invention

The aforesaid two-needle sewing machine intermittently conveys a material to be sewn 30 to a front side by a conveyor member, but sewing is performed while pressing the material to be sewn 30 with both hands. In the two-needle sewing machine, when the material to be sewn 30 is linearly sewn in the conveyance direction T, the two stitches 95A and 96A are formed to be close to each other as illustrated in FIG. 26, but when the material to be sewn 30 is sewn rotated from the conveyance direction T of the conveyor member according to a shape thereof, two stitches 95B and 96B are formed to be separated from each other as illustrated in FIG. 27. That is, when the two-needle sewing machine sews the material to be sewn 30 round by rotating the material to be sewn 30 from the conveyance direction T of the conveyor member, a pair of sewing needles 91 and 92 substantially in an orthogonal direction to a sewing direction P5 are separated each other, and as a result, a pair of stitches 95B and 96B are formed to be separate each other. Therefore, in the conventional two-needle sewing machine, there was a problem in the case of a curved needlework, since the widths of a pair of stitches are broadened, the purpose of acquiring robust sewing by making a pair of stitches close to each other is lost.

As illustrated in FIG. 28, when a material to be sewn 40 having convex portions 46 and 48 is sewn by the conventional two-needle sewing machine, linear portions 41 and 45 form a pair of stitches 95A and 96A close to each other, but curved parts 42 and 44 of the convex portions 46 and 48 form a pair of stitches 95B and 96B which are separated each other. The material to be sewn 40 generally has a pocket shape and materials are filled therein, but when materials are filled, force applied to the convex portions 46 and 48 is large, and as a result, the curve parts 42 and 44 are required to be sewn more robustly than the linear portions 41 and 45. However, when the curve parts 42 and 44 are sewn by the aforesaid two-needle sewing machine, since the stitches 95B and 96B are separated each other, the strength of the sewing is short and a pair of stitches 95B and 96B are easily broken, and as a result, the filled materials pop out. Therefore, in the conventional two-needle sewing machine, when the material to be sewn 40 having the convex portions 46 and 48 is sewn, the width of the stitches 95B and 96B that sew the peripheries of the convex portions 46 and 48 becomes large, and as a result, the strength is short. Therefore, there is also a problem in that the material to be sewn which is short in durability is formed. In particular, when a leather sheet for vehicle seat is sewn, sewing which is robust in terms of safety and appearance is required, but since there are a lot of curved sewing, a pair of stitches are separated each other and weak. Force applied to the leather sheet for vehicle seat is much larger than that that of applied to a general sheet, and as a result, a pair of stitches are broken or broadened. And a part of a pad such as urethane foam filled therein pops out or pokes out, and as a result, there is a problem in that a safety aspect and an appearance aspect are damaged.

The present invention is contrived to solve the above problems, and an object of the present invention is to provide a two-needle sewing machine and a two-needle sewing machine stitch forming method that can improve strength by placing a pair of stitches close to each other in sewing a convex curve part requiring strength at the time of sewing a pocket-shaped material to be sewn.

Means to Solve the Problem

In order to achieve the above object, a two-needle sewing machine according to a first aspect of the present application includes: a bed part on which a material to be sewn is placed; a column part erected upward from one side of the bed part; an arm part provided substantially parallel to the bed part at an upper portion of the column part; a needle shaft provided at a leading part of the arm part to reciprocate vertically by a driving motor; two sewing needles mounted on the needle shaft; two horizontal hooks that are provided in the bed part and catch the respective needle thread loops of the two sewing needles; and a conveyor member that conveys the material to be sewn in a direction approximately orthogonal to the bed part, wherein the sewing needles are arranged at both sides of a direction approximately orthogonal to a conveyance direction of the material to be sewn and a sewing needle arranged at a position distant from the column part is provided at a conveyance side of the material to be sewn rather than a sewing needle arranged at a position closer to the column part.

In order to achieve the object, a two-needle sewing machine stitch forming method according to a second aspect of the present application including a bed part on which a material to be sewn is placed; a column part erected upward from one side of the bed part; an arm part provided substantially parallel to the bed part at an upper portion of the column part; a needle shaft provided at a leading part of the arm part to reciprocate vertically by a driving motor; two sewing needles mounted on the needle shaft; two horizontal hooks that are provided in the bed part and catch respective loops of needle threads of two sewing needles; and a conveyor member that conveys the material to be sewn in a direction approximately orthogonal to the bed part, wherein the sewing needles are arranged at both sides of a direction approximately orthogonal to a conveyance direction of the material to be sewn and a sewing needle arranged at a position distant from the column part is provided at a conveyance side of the material to be sewn rather than a sewing needle arranged at a position closer to the column part, includes: forming a pair of stitches having a common stitch width by a pair of sewing needles by conveying the material to be sewn in a conveyance direction of the conveyor member; and forming a pair of stitches having a stitch width smaller than the common stitch width by a pair of sewing needles by conveying the material to be sewn in a direction distant from the column part with respect to the conveyance direction of the conveyor member.

In order to achieve the above object, a two-needle sewing machine stitch forming method on the periphery of a material to be sewn, which has a convex part by a two-needle sewing machine according to a third aspect of the present application, including a bed part on which a material to be sewn is placed; a column part erected upward from one side of the bed part; an arm part provided substantially in parallel to the bed part at an upper portion of the column part; a needle shaft provided at a leading part of the arm part to reciprocate vertically by a driving motor; two sewing needles mounted on the needle shaft; two horizontal hooks that are provided in the bed part and catch respective loops of needle threads of two sewing needles; and a conveyor member that conveys the material to be sewn in a direction approximately orthogonal to the bed part, wherein the sewing needles are arranged at both sides of a direction approximately orthogonal to a conveyance direction of the material to be sewn and a sewing needle arranged at a position distant from the column part is provided at a conveyance side of the material to be sewn rather than a sewing needle arranged at a position closer to the column part, includes: forming a pair of stitches having a common stitch width by a pair of sewing needles by conveying the material to be sewn in a conveyance direction of the conveyor member; and forming a pair of stitches having a stitch width smaller than the common stitch width on the periphery of a convex portion by a pair of sewing needles by conveying the material to be sewn in a direction distant from the column part with respect to the conveyance direction of the conveyor member.

Effect of the Invention

In the two-needle sewing machine and the two-needle sewing machine stitch forming method according to the present invention, since the material to be sewn, such as the cloth, the leather, and the like, is placed on the bed part so that the periphery of the material to be sewn faces column part, sewing can be smoothly performed without the material to be sewn to contact the column part. In the two-needle sewing machine and the two-needle sewing machine stitch forming method according to the present invention, when the two-needle sewing machine is driven, the needle shaft moves vertically, and the needle thread loops formed when a pair of sewing needles return after penetrating the material to be sewn is caught by pointed ends of the horizontal hooks to perform a needlework and the conveyor member intermittently conveys the material to be sewn in the conveyance direction to form a pair of stitches. In the two-needle sewing machine and the two-needle sewing machine stitch forming method according to the present invention, since the sewing needle arranged at the position distant from the column part is provided at the conveyance side of the material to be sewn rather than the sewing needle arranged at the position closer to the column part, when the material to be sewn is conveyed substantially parallel to the conveyance direction, a pair of stitches having the common stitch width are formed in the material to be sewn, but when the material to be sewn is rotated in the direction distant from the column part with respect to the conveyance direction, a gap between a pair of sewing needles in a direction approximately orthogonal to a sewing direction is narrowed, and as a result, a pair of stitches closely overlap with each other as the stitch width is unlimitedly close to 0. As such, in the two-needle sewing machine and the two-needle sewing machine stitch forming method according to the present invention, a pair of stitches is close to each other during a curved needlework, thereby improving the strength of the stitch. Accordingly, in the two-needle sewing machine and the two-needle sewing machine stitch forming method according to the present invention, when the pocket-shaped material is sewn, the strength can be improved by placing the stitches close to each other at convex curve parts requiring the strength.

BEST MODE FOR CARRYING OUT OF THE INVENTION

Figure 1:
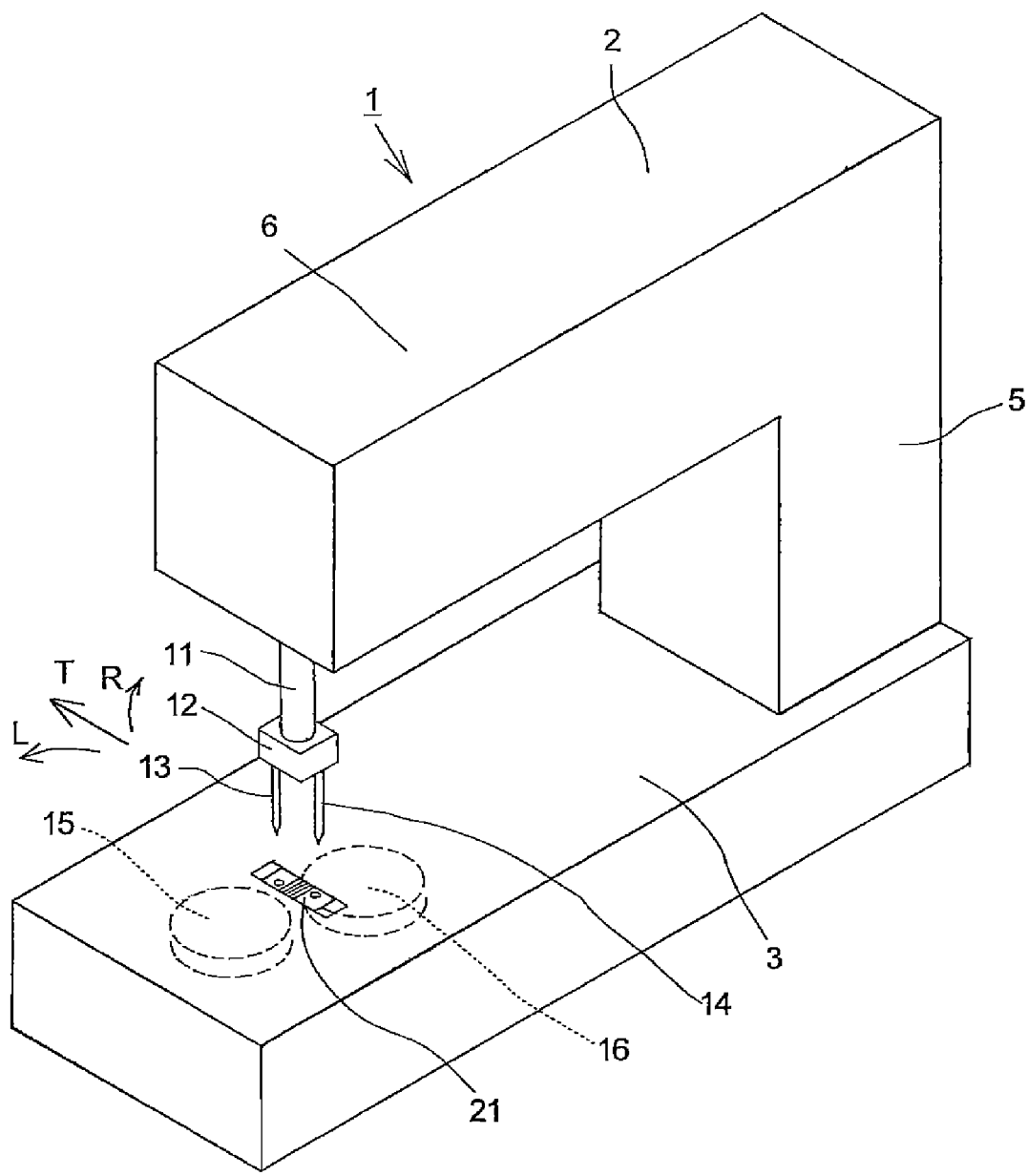
FIG. 1 is an overall perspective view illustrating an embodiment of a two-needle sewing machine according to the present invention.

A two-needle sewing machine 1 includes a bed part 3 on which materials to be sewn are placed, a column part 5 erected upward from one side (right side) of the bed part 3, an arm part 6 provided to be substantially parallel to the bed part 3 at an upper part of the column part 5, a needle shaft 11 provided at a leading part of the arm part 6 and reciprocates vertically by a driving motor, two sewing needles 13 and 14 mounted on the needle shaft 11, two horizontal hooks 15 and 16 provided in the bed part 3, to which loops of needle threads of two sewing needles 13 and 14 are caught, respectively, and a conveyor member 21 conveying the materials to be sewn substantially in an orthogonal direction to the bed part 3, as illustrated in FIG. 1. In the two-needle sewing machine 1, the sewing needles 13 and 14 are arranged at both sides substantially in an orthogonal direction to a conveyance direction T of the materials to be sewn, and the sewing needle 13 arranged at a position distant from the column part 5 provided at a conveyance side of the material to be sewn rather than the sewing needle 14 arranged at a position closer to the column part 5.

Figure 3:
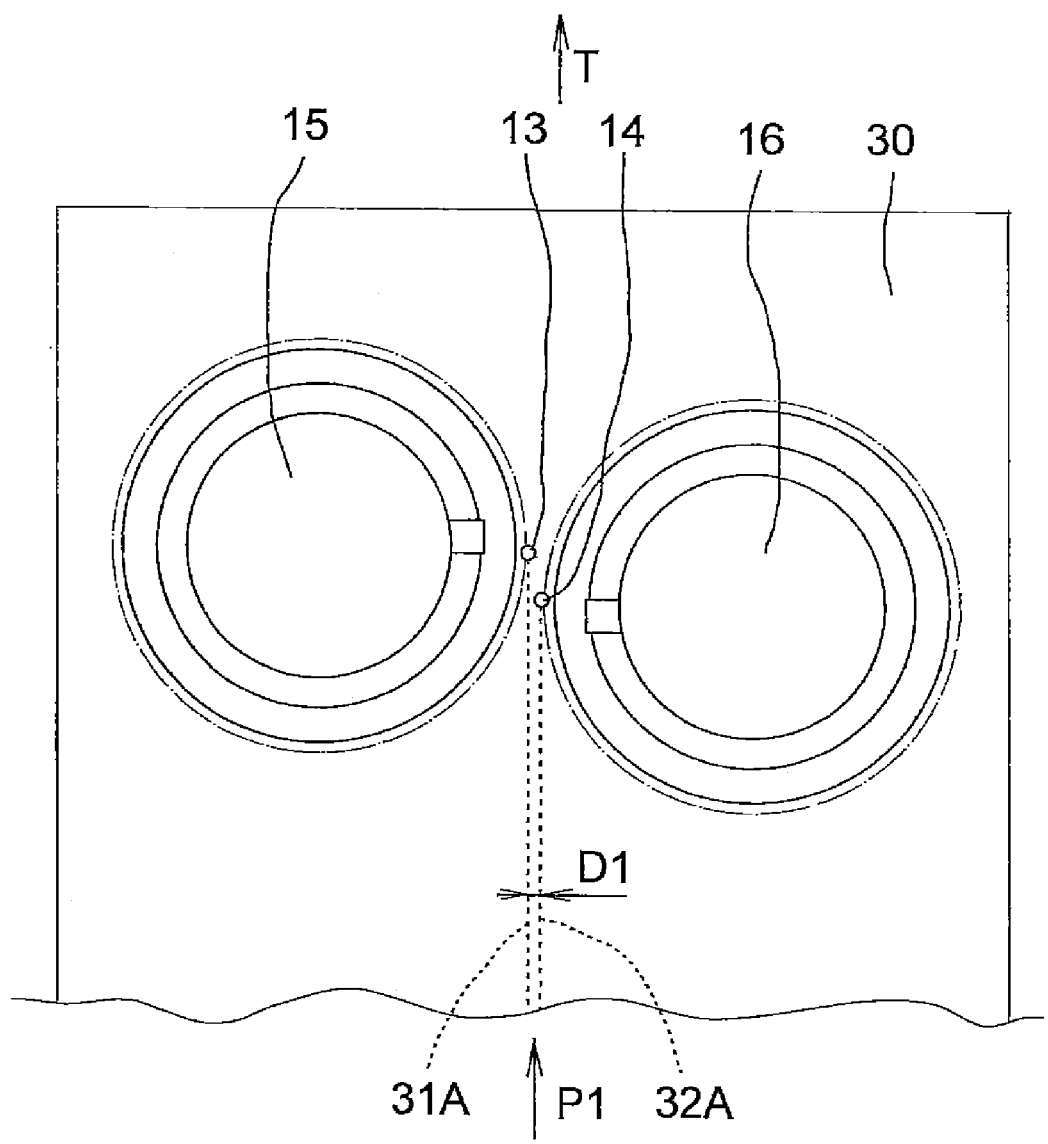
FIG. 3 is an explanatory diagram illustrating a common two-needle sewing machine stitch forming method of FIG. 1.
Figure 6:
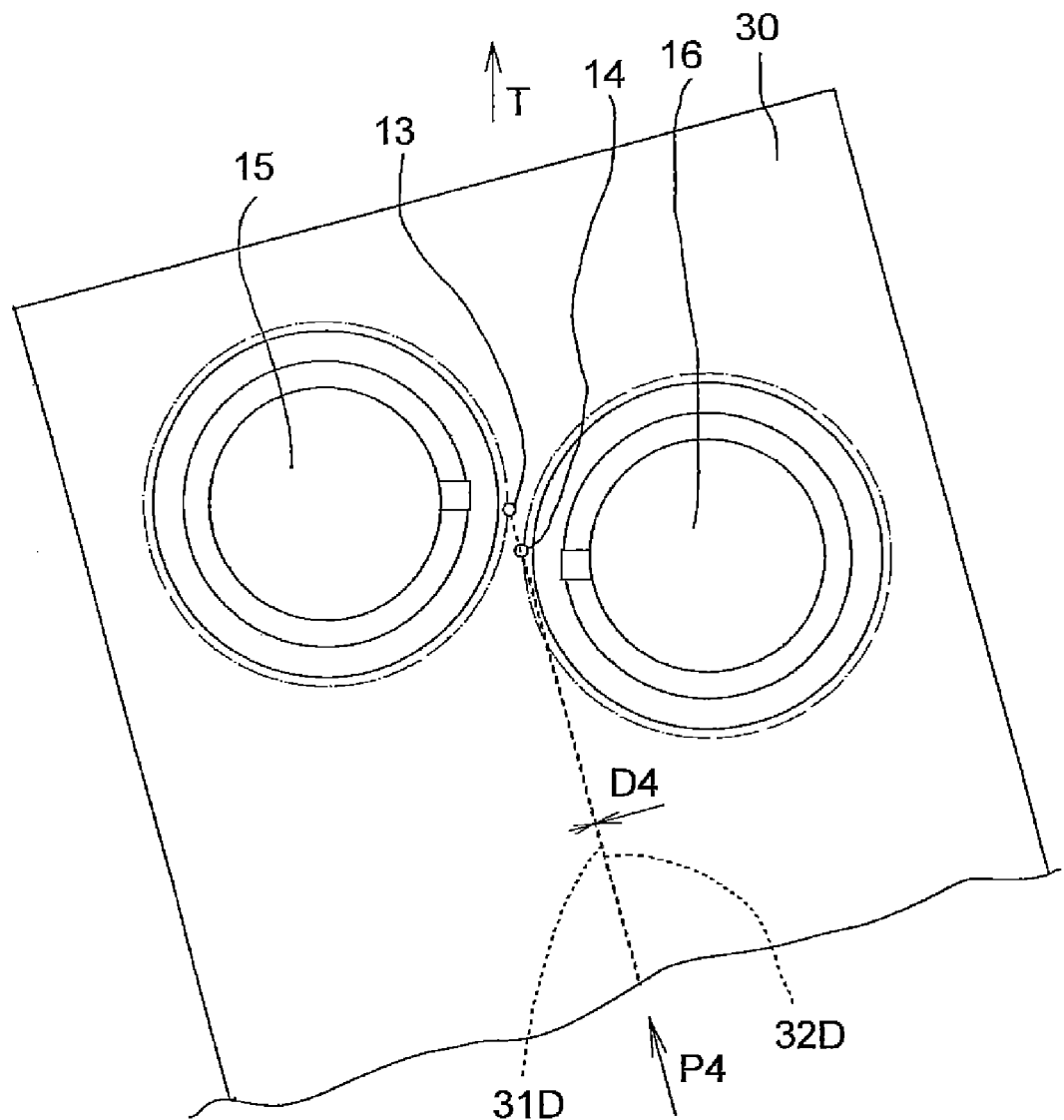
FIG. 6 is an explanatory diagram illustrating a method for forming an inclined stitch of the two-needle sewing machine of FIG. 1.

In a method for forming a stitch of the two-needle sewing machine 1, a material to be sewn 30 is conveyed in the conveyance direction T of the conveyor member 21, and as a result, a pair of stitches 31A and 32A having a common stitch width D1 are formed by the pair of sewing needles 13 and 14, as illustrated in FIG. 3. Further, as illustrated in FIG. 6, the material to be sewn 30 is conveyed in a direction distant from the column part 5 with respect to the conveyance direction T of the conveyor member 21, and as a result, a pair of stitches 31D and 32D having a stitch width D4 which is smaller than the common stitch width D1 are formed by the pair of sewing needles 13 and 14.

Figure 7:
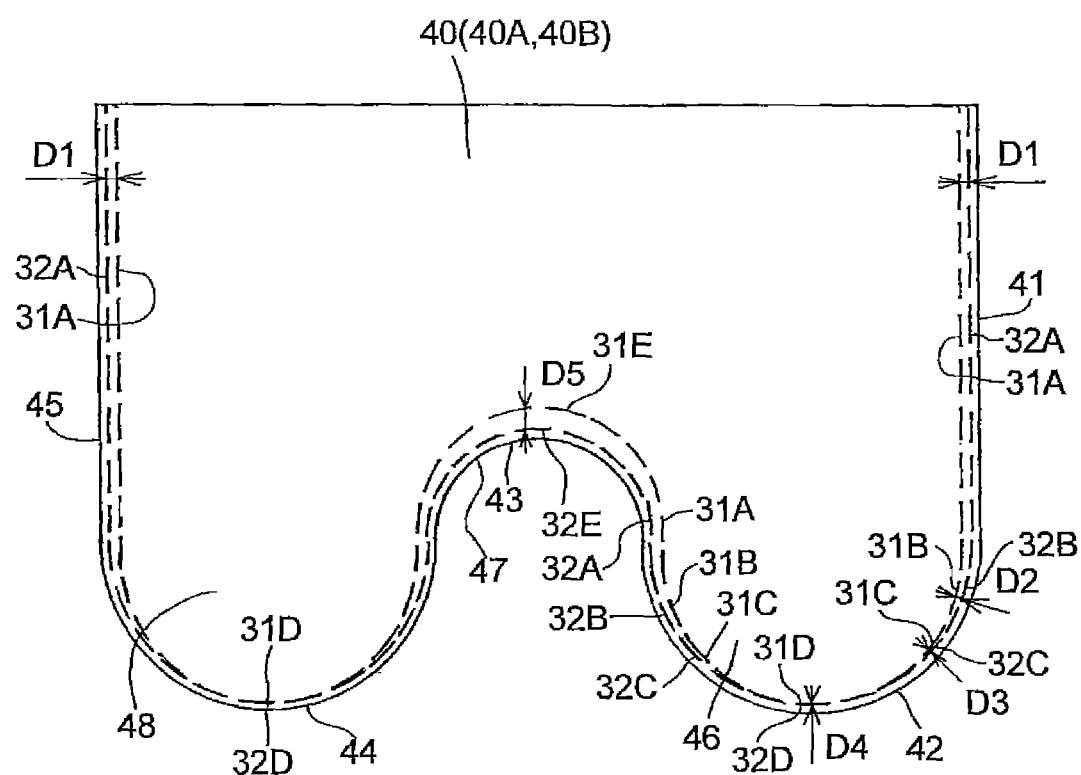
FIG. 7 is an explanatory diagram of a material to be sewn which is sewn by the two-needle sewing machine of FIG. 1.
Figure 8:
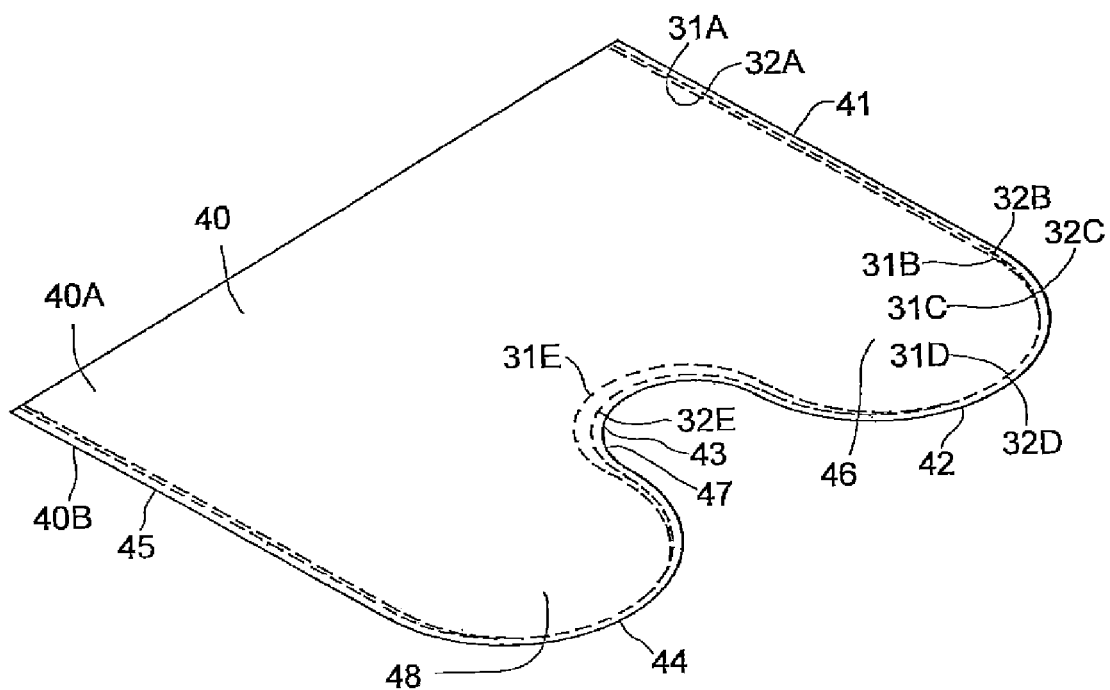
FIG. 8 is a perspective view of the material to be sewn which is sewn by the two-needle sewing machine of FIG. 1.

The above-mentioned method for forming a stitch of the two-needle sewing machine 1 is the method for forming a stitch on the periphery of a pocket-shaped material to be sewn 40 including convex portions 46 and 48, a material to be sewn 40 is conveyed in the conveyance direction of the conveyor member 21, and as a result, the pair of stitches 31A and 32A having the common stitch width D1 are formed by the pair of sewing needles 13 and 14, as illustrated in FIGS. 7 and 8. Further, the material to be sewn 40 is conveyed in the direction distant from the column part 5 with respect to the conveyance direction T of the conveyor member 21, and as a result, the pair of stitches 31D and 32D having the stitch width D4 which is smaller than the common stitch width D1 are formed on the peripheries of the convex portions 46 and 48 by the pair of sewing needles 13 and 14.

Figure 11:
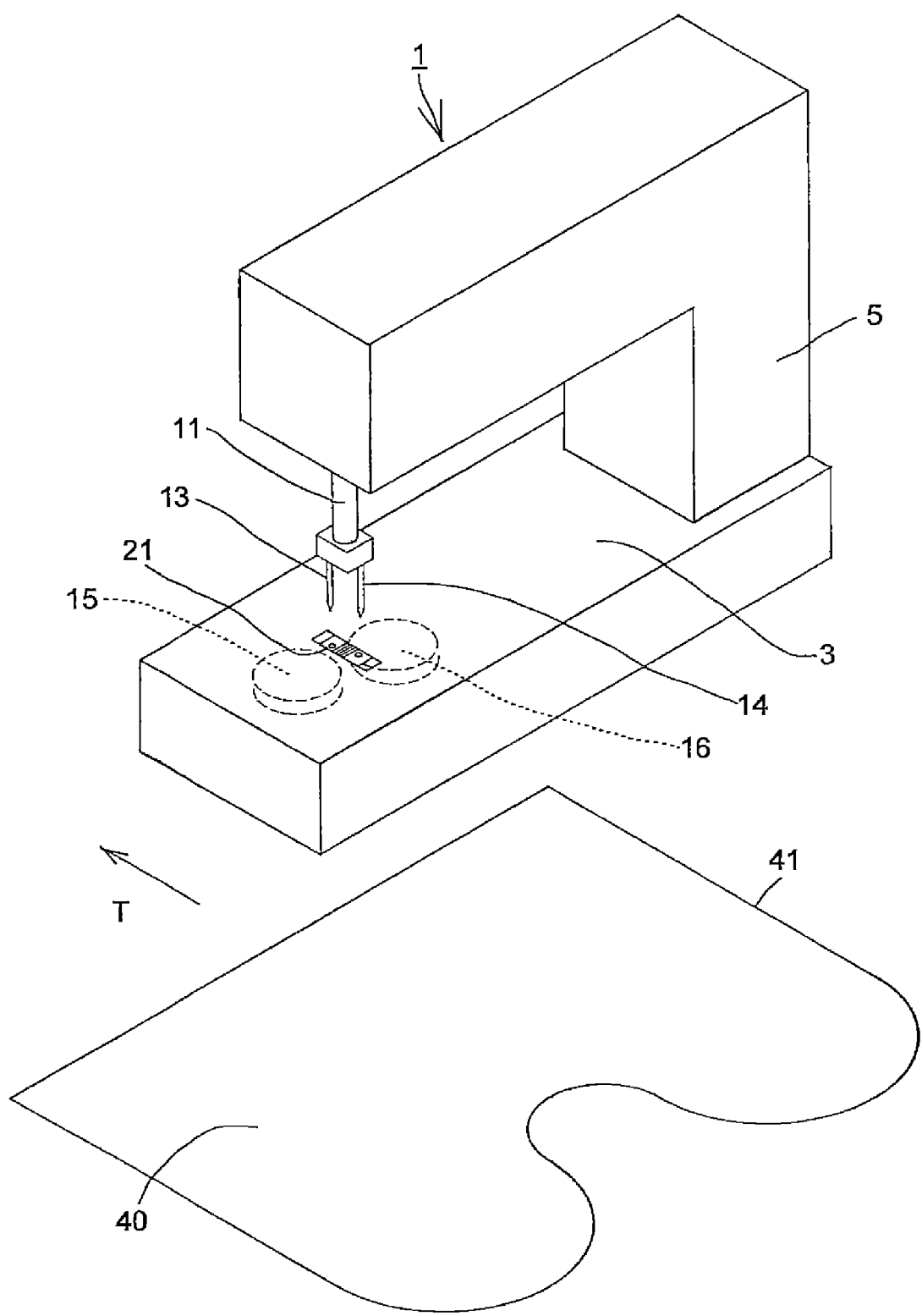
FIG. 11 is a perspective view illustrating a first sewing sequence by the two-needle sewing machine of FIG. 1.
Figure 12:
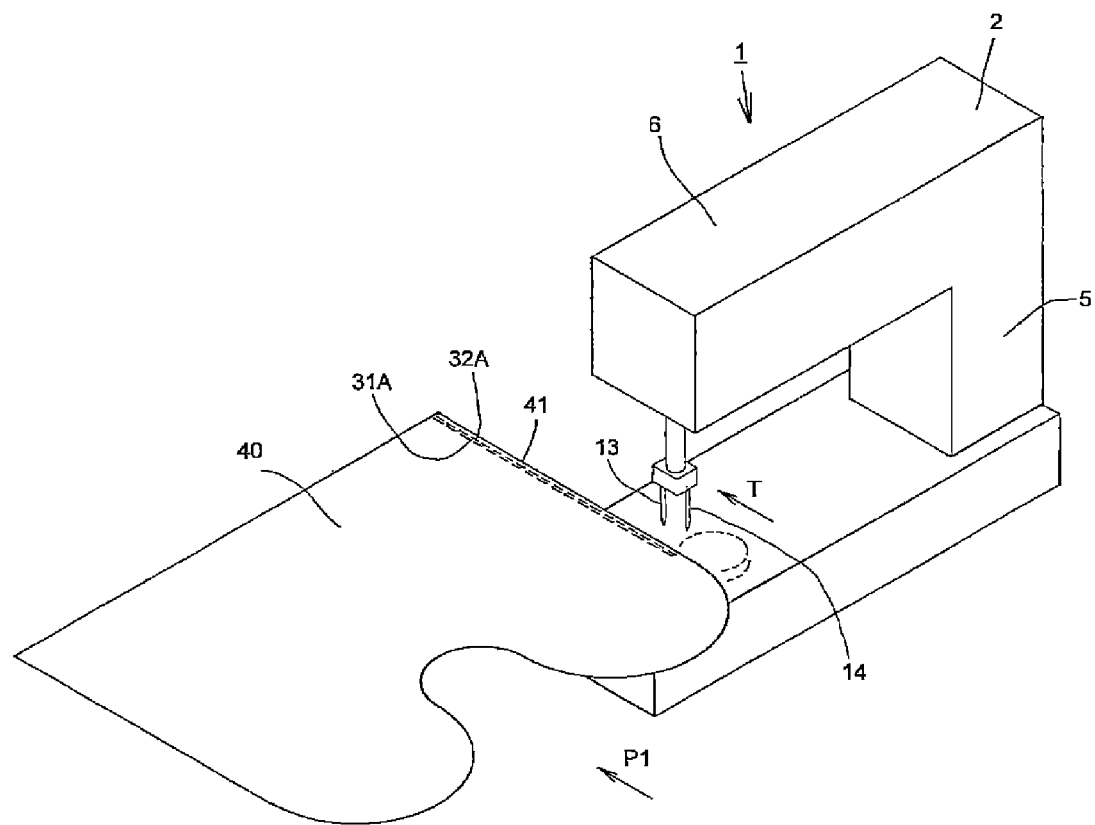
FIG. 12 is a perspective view illustrating a second sewing sequence by the two-needle sewing machine of FIG. 1.
Figure 13:
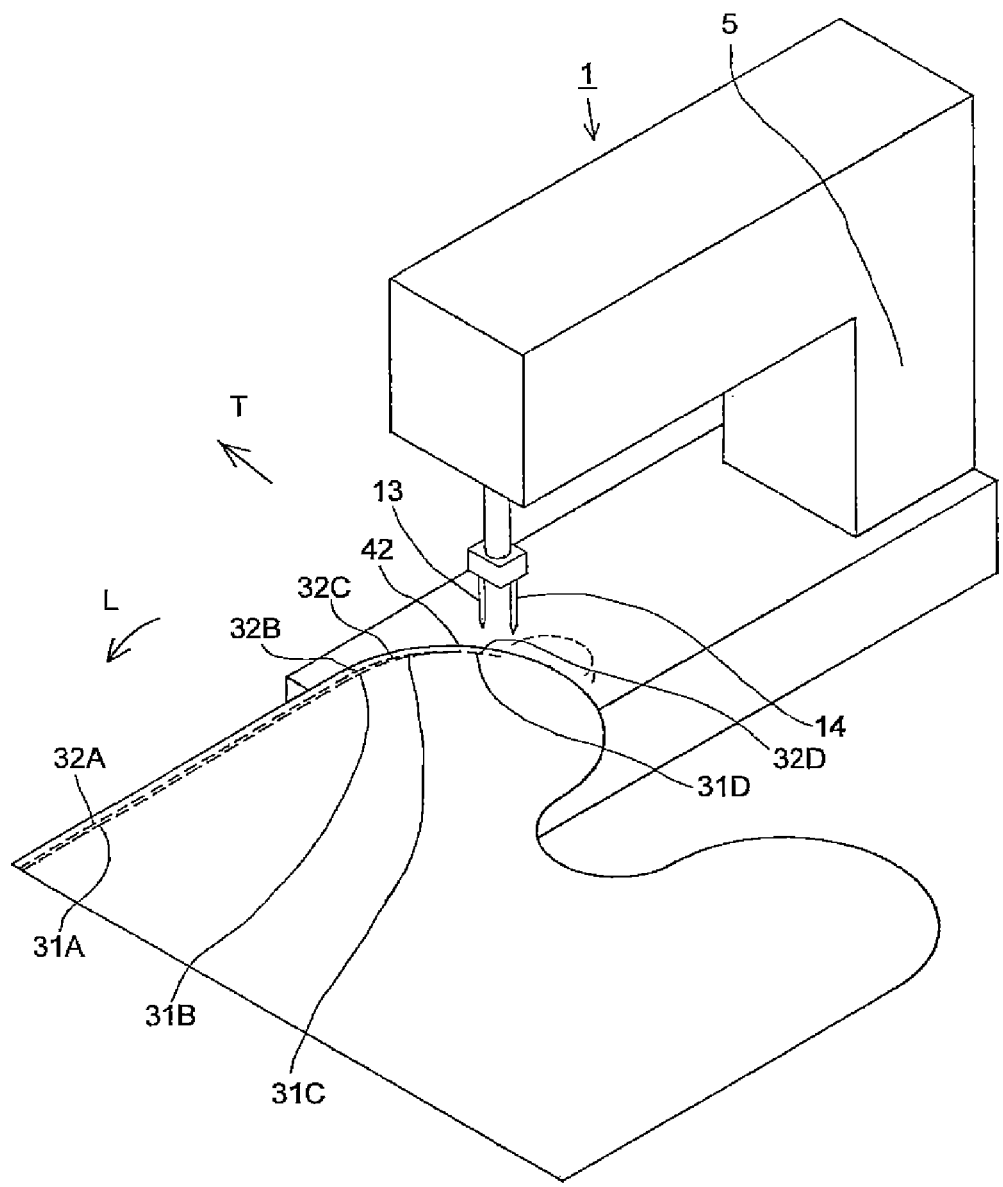
FIG. 13 is a perspective view illustrating a third sewing sequence by the two-needle sewing machine of FIG. 1.

In the two-needle sewing machine 1, since the material to be sewn 40 is placed on the bed part 3 so that the periphery of the material to be sewn 40 (a right linear portion 41) such as a cloth, leather, and the like to face the column part 5 as illustrated in FIG. 11, the material to be sewn 40 can be smoothly sewn without contacting the column part 5. When the two-needle sewing machine 1 is driven, the needle shaft 11 moves vertically, and the needle thread loops formed when the pair of sewing needles 13 and 14 return after penetrating the material to be sewn 40 is caught by pointed ends of the horizontal hooks 15 and 16 to perform a lockstitching and the conveyor member 21 intermittently conveys the material to be sewn 40 in the conveyance direction T to form a pair of stitches 31 and 32. In the two-needle sewing machine 1, since the sewing needle 13 arranged at the position distant from the column part 5 is provided at the conveyance side of the material to be sewn 40 rather than the sewing needle 14 arranged at the position close to the column part 5, when the material to be sewn 40 is conveyed substantially parallel to the conveyance direction T, the pair of stitches 31A and 32A having the common stitch width D1 are formed on the material to be sewn 40 as illustrated in FIG. 12. Further, as illustrated in FIG. 13, when the material to be sewn 40 is rotated in the direction (left direction L) distant from the column part 5 with respect to the conveyance direction T, a gap between the pair of sewing needles 13 and 14 in a direction approximately orthogonal to a sewing direction P is narrowed, and as a result, the pair of stitches 31D and 32D closely overlap with each other as the stitch width is unlimitedly close to 0. As such, in the two-needle sewing machine 1, the pair of stitches 31 and 32 is close to each other during a curved needlework, and thus the strength of the stitch may be improved. Accordingly, in the two-needle sewing machine 1, when sewing the pocket-shaped material to be sewn 40 having the convex portions 46 and 48, the strength may be improved by making the stitches close to each other at convex curve parts 42 and 44 requiring the strength.

Further, the two-needle sewing machine will be described in detail. As illustrated in FIG. 1, a sewing machine body 2 of the two-needle sewing machine 1 is constituted by the bed part 3 on which the materials to be sewn such as the cloth, the leather, and the like are placed, the column part 5 erected upward from one side (right side) of the bed part 3, and the arm part 6 provided substantially in parallel to the bed part 3 from the upper side of the column part 5.

The needle shaft 11 that reciprocates vertically by a driving motor (not illustrated) is provided at the leading part (left portion) of the arm part 6. A needle supporting member 12 mounted with the two sewing needles 13 and 14 is fixed to a lower end of the needle shaft 11. Further, two horizontal hooks 15 and 16 that are rotated in synchronization with reciprocation of the needle shaft 11 are provided in the bed part 3. The horizontal hook 16 positioned at one side (right side) is configured to catch up the loop of the needle thread of the sewing needle 14 and the horizontal hook 15 positioned at the other side (the other surface) (left direction) is configured to hook up the loop of the needle thread of the sewing needle 13.

Further, the downward conveyor member 21 positioned between the horizontal hooks 15 and 16 is provided in the bed part 3. The downward conveyor member 21 is synchronized with the reciprocation of the needle shaft 11 and configured to intermittently convey the materials to be sewn such as the cloth, the leather, and the like in the direction (front side, the T direction illustrated in FIG. 1) approximately orthogonal to the bed part 3.

Figure 2:
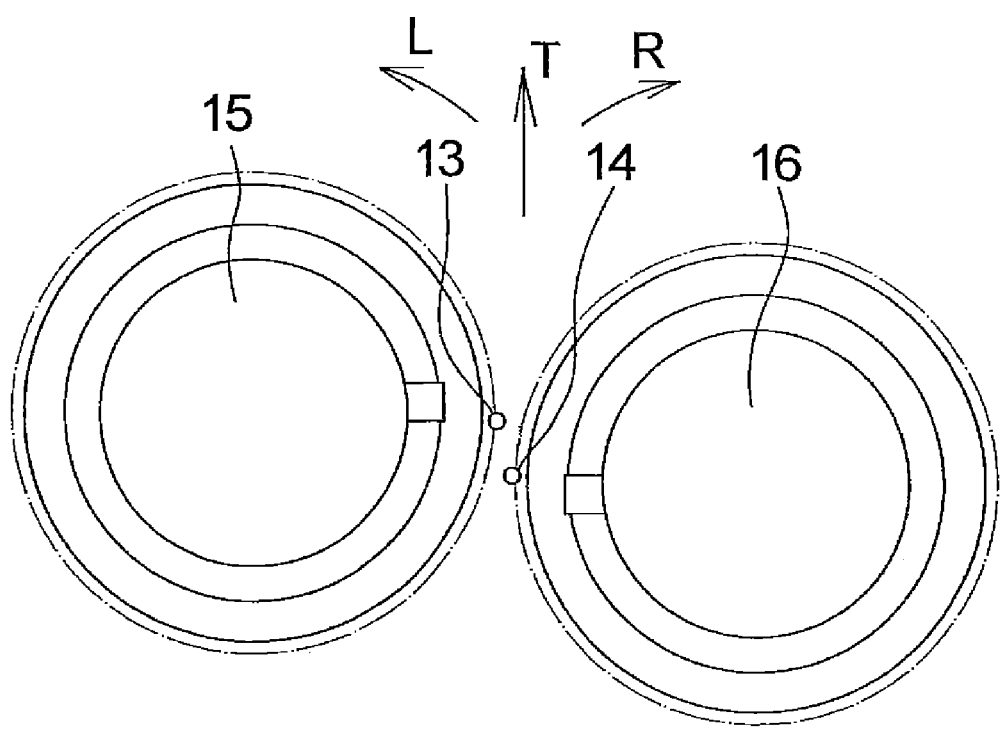
FIG. 2 is an explanatory diagram of primary components of the two-needle sewing machine of FIG. 1.

In the two-needle sewing machine 1, two stitches are formed substantially parallel to each other by the sewing needles 13 and 14. The sewing needles 13 and 14 are separated from each other by approximately 3 mm or more based on the relationship of an outer diameter of the sewing needle itself and the arrangement of the horizontal hook, and the position of one sewing needle 13 and the position of the other sewing needle 14 deviate from each other in order to set the width of the stitch to approximately 0.3 mm. The width of the stitch of approximately 0.3 mm is a distance for preventing the stitch formed by the sewing needle 13 and the stitch formed by the sewing needle 14 from overlapping with each other. As illustrated in FIG. 2, in the two-needle sewing machine 1, the sewing needles 13 and 14 are arranged at both sides substantially in the orthogonal direction to the conveyance direction T of the material to be sewn, the sewing needle 13 arranged at the position (left side) distant from the column part 5 is positioned at the front side (the front side of the conveyance direction T), and the sewing needle 14 arranged at the position (right side) closer to the column part 5 is positioned at a rear side (a rear side of the conveyance direction T), and as a result, the sewing needle 13 is provided at the conveyance side of the material to be sewn rather than the sewing needle 14. Therefore, as illustrated in FIG. 3, the sewing needles 13 and 14 are separated from each other as described above, but the gap between the sewing needles 13 and 14 substantially in the orthogonal direction to the sewing direction P1 is narrowed to reduce the width of the stitch.

The horizontal hook 15 that hooks up the loop of the needle thread formed by the sewing needle 13 and the horizontal hook 16 that hooks up the loop of the needle thread formed by the sewing needle 14 are arranged at both left and right sides, with the sewing needles 13 and 14 interposed therebetween. That is, the horizontal hooks 15 and 16 are arranged at both sides substantially in the orthogonal direction to the conveyance direction T of the material to be sewn, the horizontal hook 15 arranged at the position (left side) distant from the column part 5 is positioned at the front side (the front side of the conveyance direction T), and the horizontal hook 16 arranged at the position (right side) closer to the column part 5 is positioned at the rear side (the rear side of the conveyance direction T), and as a result, the horizontal hook 15 is provided at the conveyance side of the material to be sewn rather than the horizontal hook 16.

Figure 4:
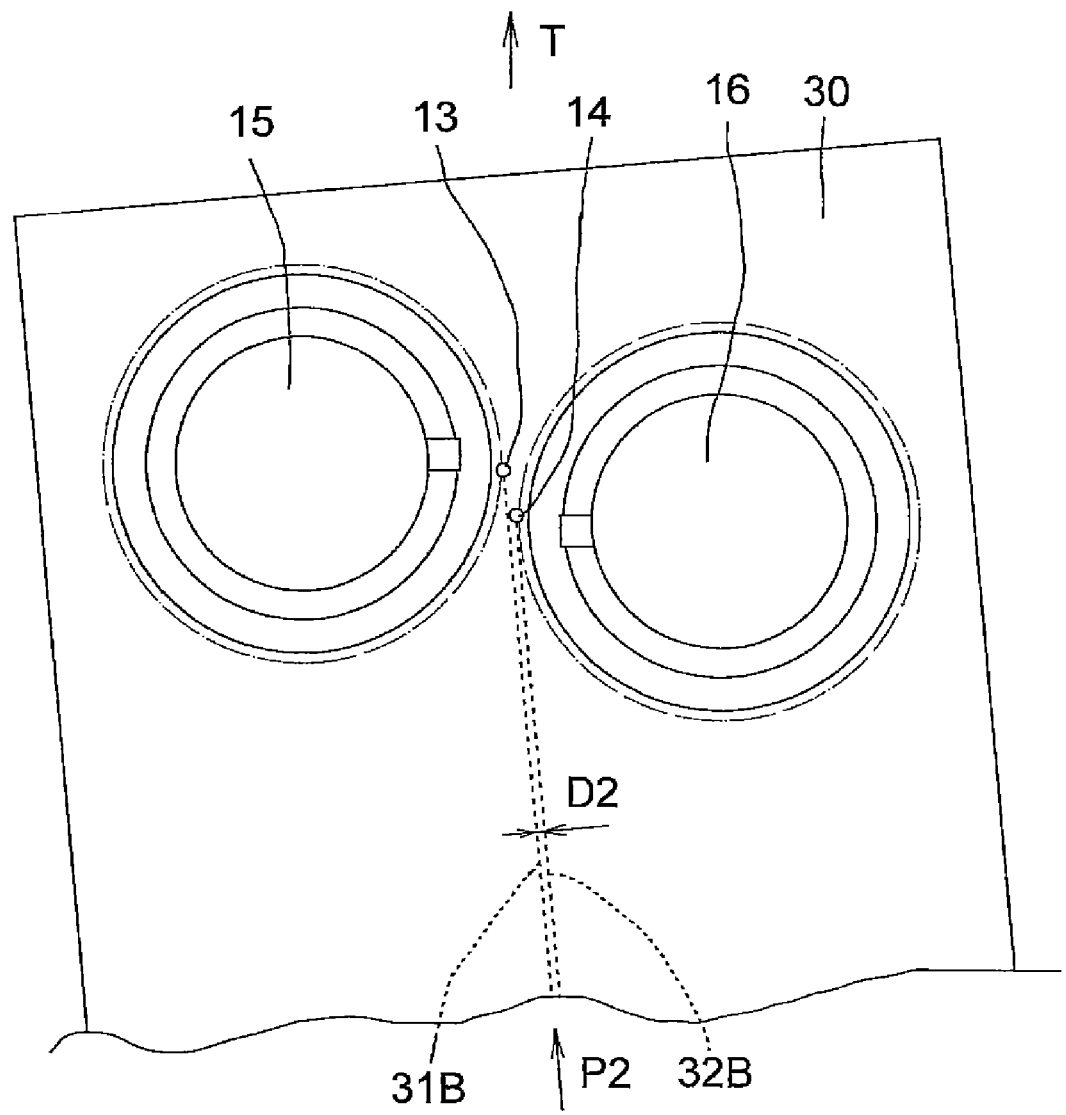
FIG. 4 is an explanatory diagram illustrating a method for forming an inclined stitch of the two-needle sewing machine of FIG. 1.

As illustrated in FIG. 3, in the two-needle sewing machine 1, the material to be sewn 30 such as the leather, the cloth, and the like is conveyed in the sewing direction P1 substantially parallel to the conveyance direction T of the downward conveyor member 21, and as a result, the pair of stitches 31A and 32A having the common stitch width D1 are formed by the pair of sewing needles 13 and 14. As illustrated in FIG. 4, in the two-needle sewing machine 1, the material to be sewn 30 is conveyed to be turned left in a sewing direction P2 (an inclination angle of approximately 5 degrees) distant from the column part 5 with respect to the conveyance direction T of the downward conveyor member 21, and as a result, the gap between the sewing needles 13 and 14 in the direction approximately orthogonal to the sewing direction P2 is further narrowed to form the pair of stitches 31B and 32B having a stitch width D2 smaller than the common stitch width D1 by the pair of sewing needles 13 and 14.

Figure 5:
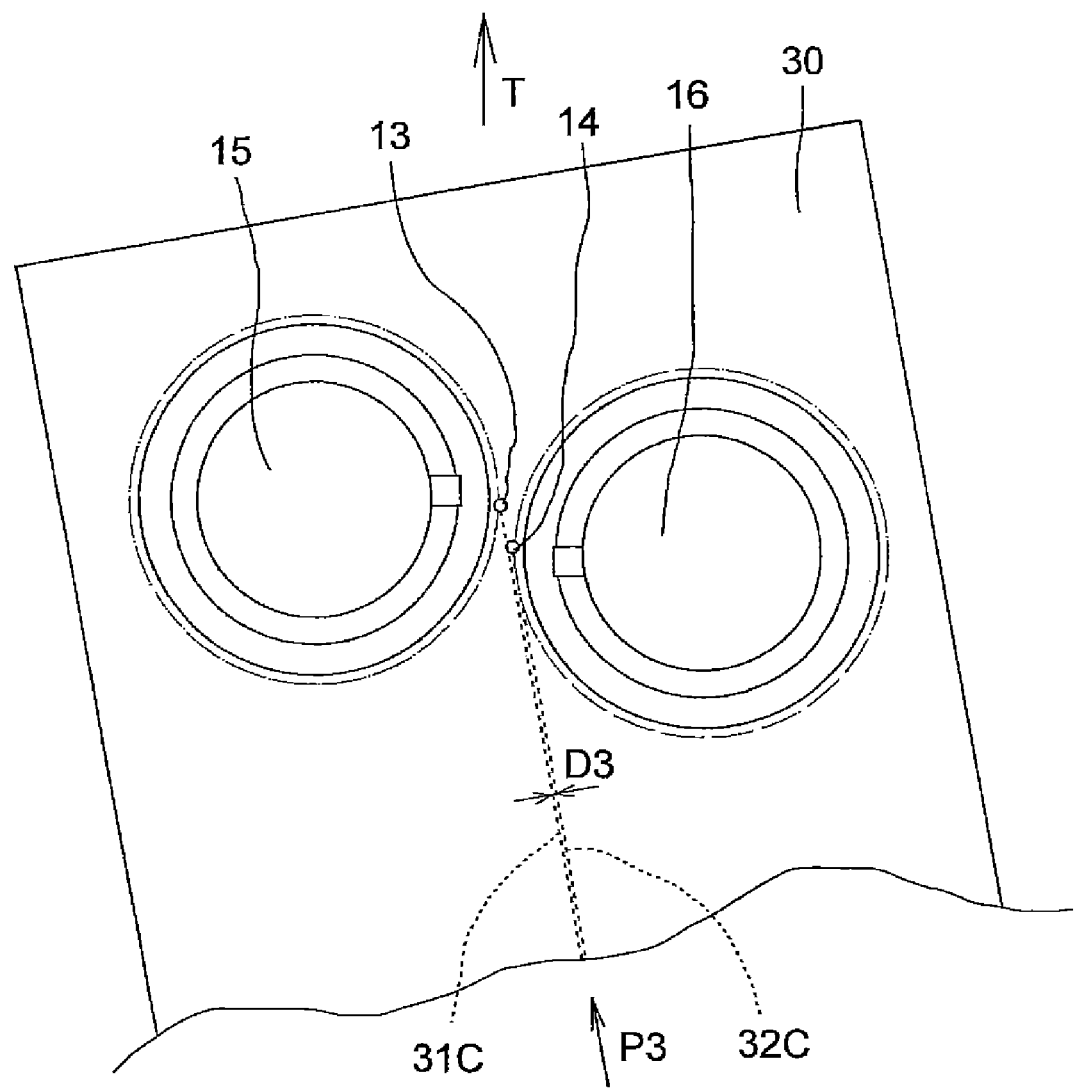
FIG. 5 is an explanatory diagram illustrating a method for forming an inclined stitch of the two-needle sewing machine of FIG. 1.

As illustrated in FIG. 5, in the two-needle sewing machine 1, the material to be sewn 30 is conveyed to be turned left in a sewing direction P3 (at an inclination angle of approximately 10 degrees) distant from the column part 5 with respect to the conveyance direction T of the downward conveyor member 21, and as a result, the gap between the sewing needles 13 and 14 in the direction approximately orthogonal to the sewing direction P3 is further narrowed to form a pair of stitches 31C and 32C having a stitch width D3 smaller than the common stitch width D2 by the pair of sewing needles 13 and 14. As illustrated in FIG. 6, in the two-needle sewing machine 1, the material to be sewn 30 is conveyed to be turned left in a sewing direction P4 (at an inclination angle of approximately 15 degrees) distant from the column part 5 with respect to the conveyance direction T of the downward conveyor member 21, and as a result, the gap between the sewing needles 13 and 14 in the direction approximately orthogonal to the sewing direction P4 is further narrowed to form a pair of stitches 31D and 32D having a stitch width D4 smaller than the common stitch width D3 by the pair of sewing needles 13 and 14. The stitches 31D and 32D are brought into close contact with each other and approximately overlap with each other. Like this, in the two-needle sewing machine 1, as a left-turn angle of the material to be sewn 30 is larger, the stitch width is narrowed. Meanwhile, in the two-needle sewing machine 1, when the left-turn angle of the material to be sewn 30 is made larger, the left stitch 31 moves to a right side and the right stitch 32 moves to the left side in some cases, but even in this case, since the pair of stitches 31 and 32 are close to each other, robust sewing may be acquired.

The pocket-shaped material to be sewn 40 is sewn by the two-needle sewing machine 1 as illustrated in FIGS. 7 and 8. The material to be sewn 40 is constituted by a pair of sheet members 40A and 40B such as the cloth, the leather, and the like. The sheet members 40A and 40B include a right convex portion 46 and a left convex portion 48 which are curved, and a central concave part 47 which is curved. The sheet members 40A and 40B include a right linear portion 41 and a left linear portion 45 which are substantially parallel to each other, a right curve part 42 continues from the right linear portion 41, which is substantially semicircle convex, a left curve part 44 continues from the left linear portion 45, which is substantially semicircle convex, and a central curve part 43 continues to the right curve part 42 and the left curve part 44, which is substantially semicircle concave. And the right convex portion 46 is formed by the right curve part 42, the left convex portion 48 is formed by the left curve part 44, and the central convex portion 47 is formed by the central curve part 43.

As illustrated in FIG. 11, sewing is performed by the two-needle sewing machine 1 substantially in parallel along the right linear portion 41 of the material to be sewn 40 comprising a pair of sheets 40A and 40B overlapped each other. As illustrated in FIG. 12, in the two-needle sewing machine 1, since the material to be sewn 40 is conveyed in the sewing direction P1 substantially parallel to the conveyance direction T of the downward conveyor member 21, the pair of stitches 31A and 32A having the common stitch width D1 are formed by the pair of sewing needles 13 and 14. As illustrated in FIG. 13, in the two-needle sewing machine 1, when sewing is performed along the right curve part 42, since the material to be sewn 40 is inclined and conveyed in the direction (left direction L) distant from the column part 5 with respect to the conveyance direction T of the downward conveyor member 21, the width of the stitch formed by the pair of sewing needles 13 and 14 is narrowed almost to 0 and the pair of stitches 31D and 32D substantially overlap with each other closely.

Figure 14:
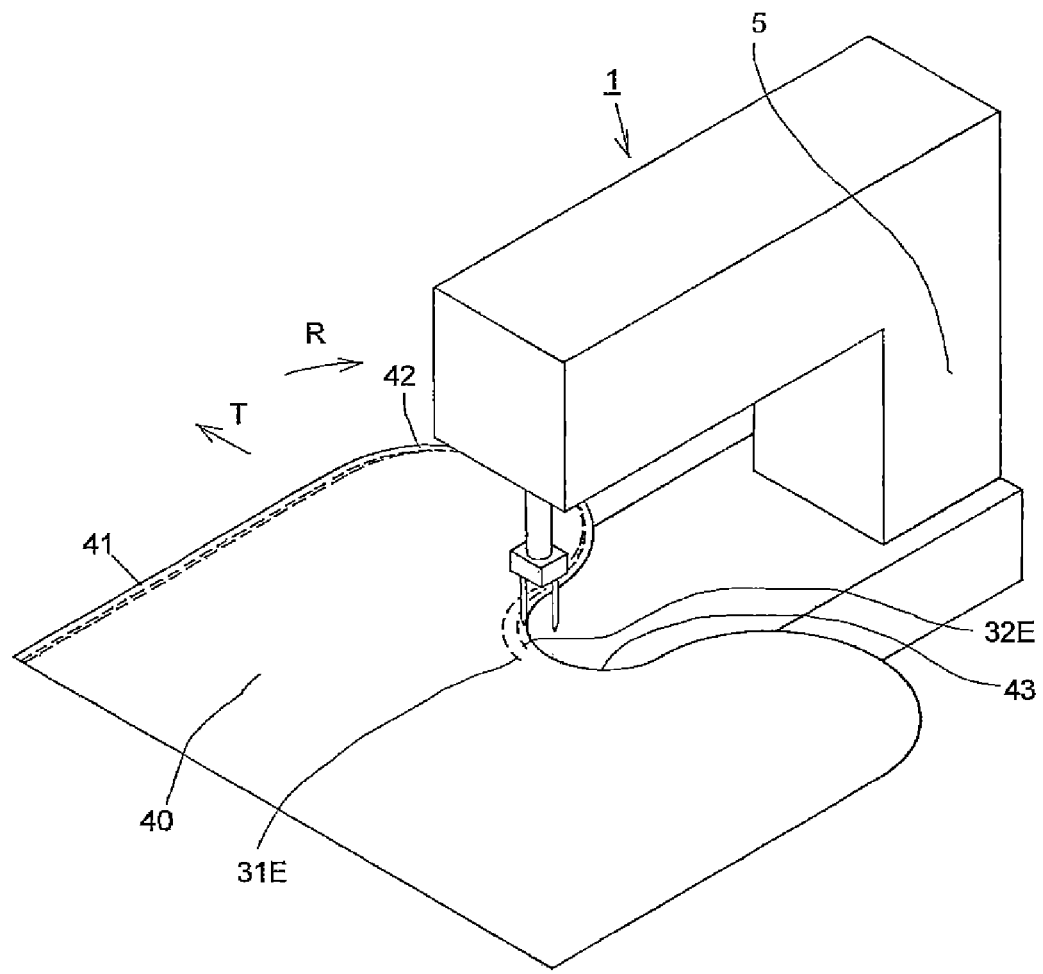
FIG. 14 is a perspective view illustrating a fourth sewing sequence by the two-needle sewing machine of FIG. 1.
Figure 15:
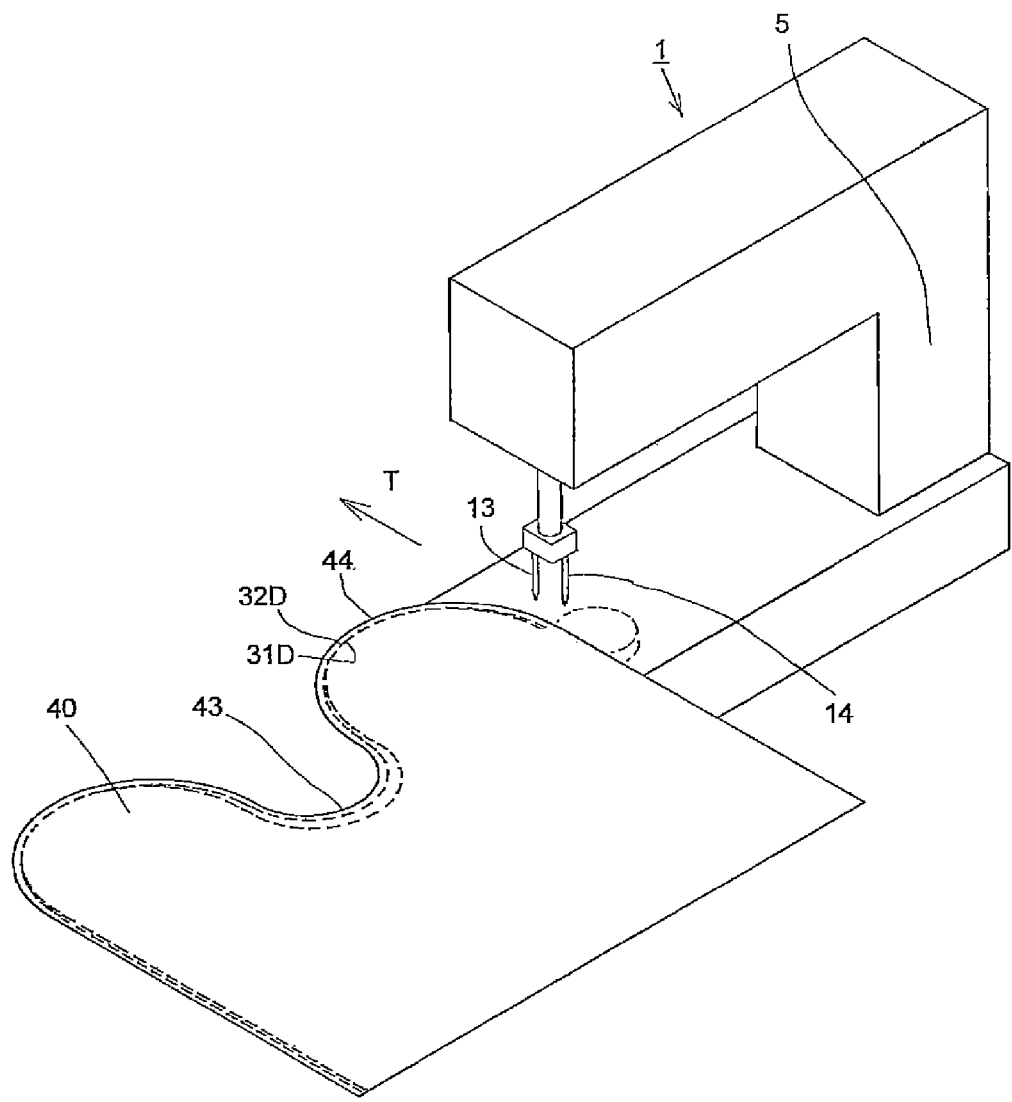
FIG. 15 is a perspective view illustrating a fifth sewing sequence by the two-needle sewing machine of FIG. 1.
Figure 16:
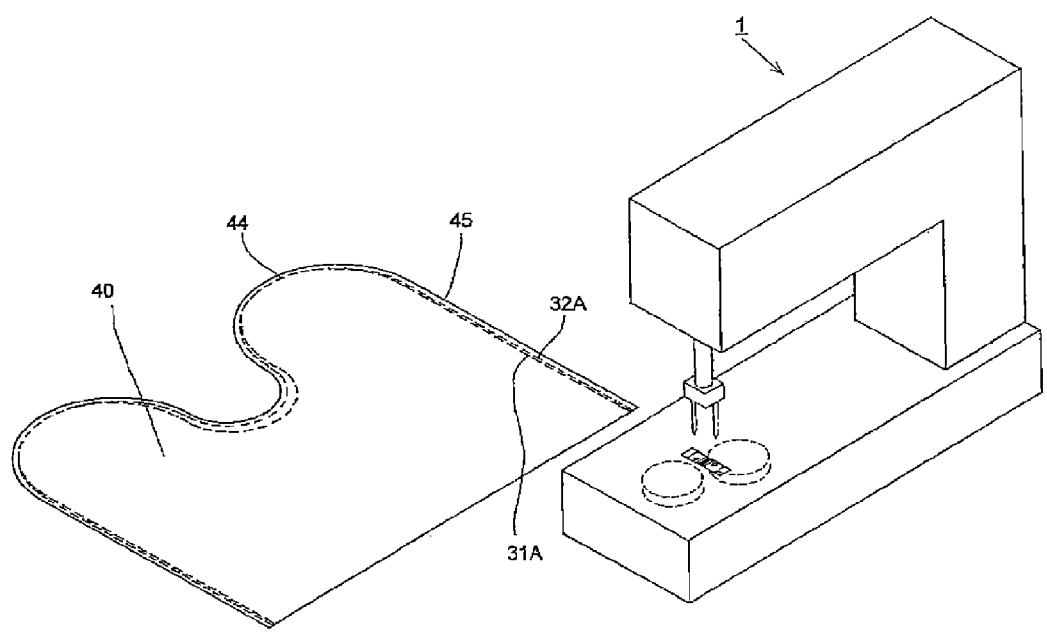
FIG. 16 is a perspective view illustrating a sixth sewing sequence by the two-needle sewing machine of FIG. 1.

As illustrated in FIG. 14, in the two-needle sewing machine 1, when sewing is performed on the right curve part 42 along the central curve part 43, since the material to be sewn 40 is inclined and conveyed in a direction (right direction R) close to the column part 5 with respect to the conveyance direction T of the downward conveyor member 21, a gap between a pair of stitches 31E and 32E formed by the pair of sewing needles 13 and 14 becomes a stitch width D5 which is larger than the common stitch width D1. As illustrated in FIG. 15, in the two-needle sewing machine 1, when sewing is performed along the left curve part 44 on the central curve part 43, since the material to be sewn 40 is inclined and conveyed in the direction (left direction L) distant from the column part 5 with respect to the conveyance direction T of the downward conveyor member 21, the pair of stitches 31D and 32D formed by the pair of sewing needles 13 and 14 substantially overlap with each other closely, as described above. As illustrated in FIG. 16, in the two-needle sewing machine 1, when sewing is performed along the left linear portion 45 on the left curve part 44, since the material to be sewn 40 is inclined and conveyed in the direction (right direction R) close to the column part 5 with respect to the conveyance direction T of the downward conveyor member 21, a gap between the pair of stitches 31A and 32A formed by the pair of sewing needles 13 and 14 becomes the common stitch width D1 (see FIG. 7).

As illustrated in FIGS. 7 and 8, in the material to be sewn 40, the stitches 31D and 32D that sew the peripheries of the right convex portion 46 and the left convex portion 48 closely overlap with each other, and as a result, the gap between the stitches 31E and 32E that sew the periphery of the central concave part 47 becomes larger. In the material to be sewn 40, force applied to the convex portions 46 and 48 is large, but since the stitches 31D and 32D closely overlap with each other, the strength is improved, and as a result, the stitches 31D and 32D are not broadened and the stitches 31D and 32D are not broken easily. Therefore, the material to be sewn 40 is robust and durable. Meanwhile, in the material to be sewn 40, since force applied to the concave part 47 is small, even though the widths of the stitches 31E and 32E are larger, a problem does not particularly occur.

Figure 9:
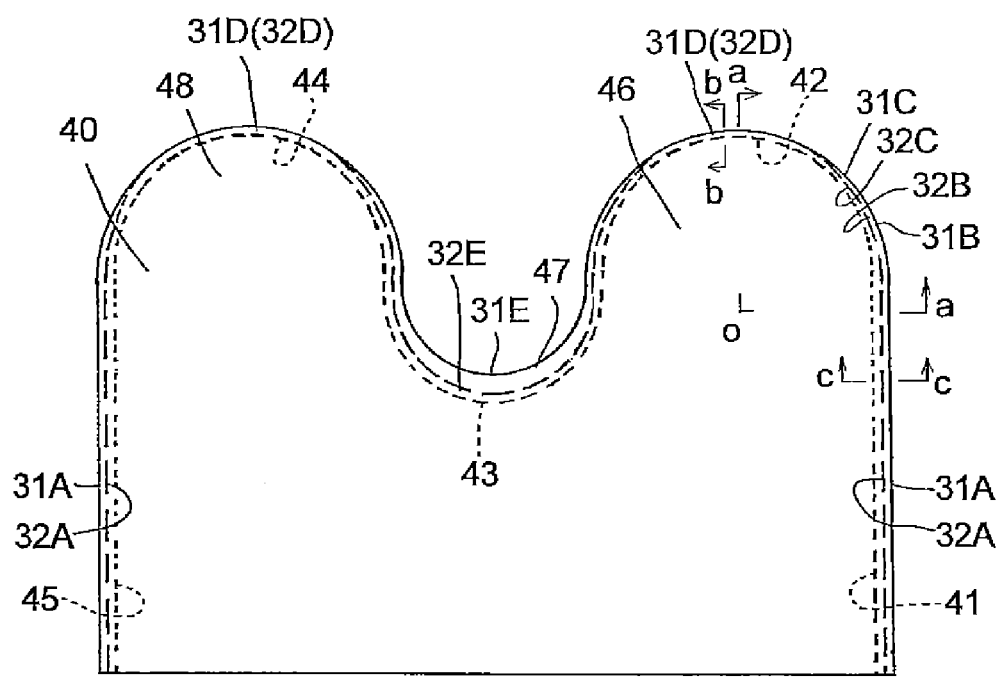
FIG. 9 is an explanatory diagram of a state in which the material to be sewn of FIG. 7 overturns.
Figure 10:
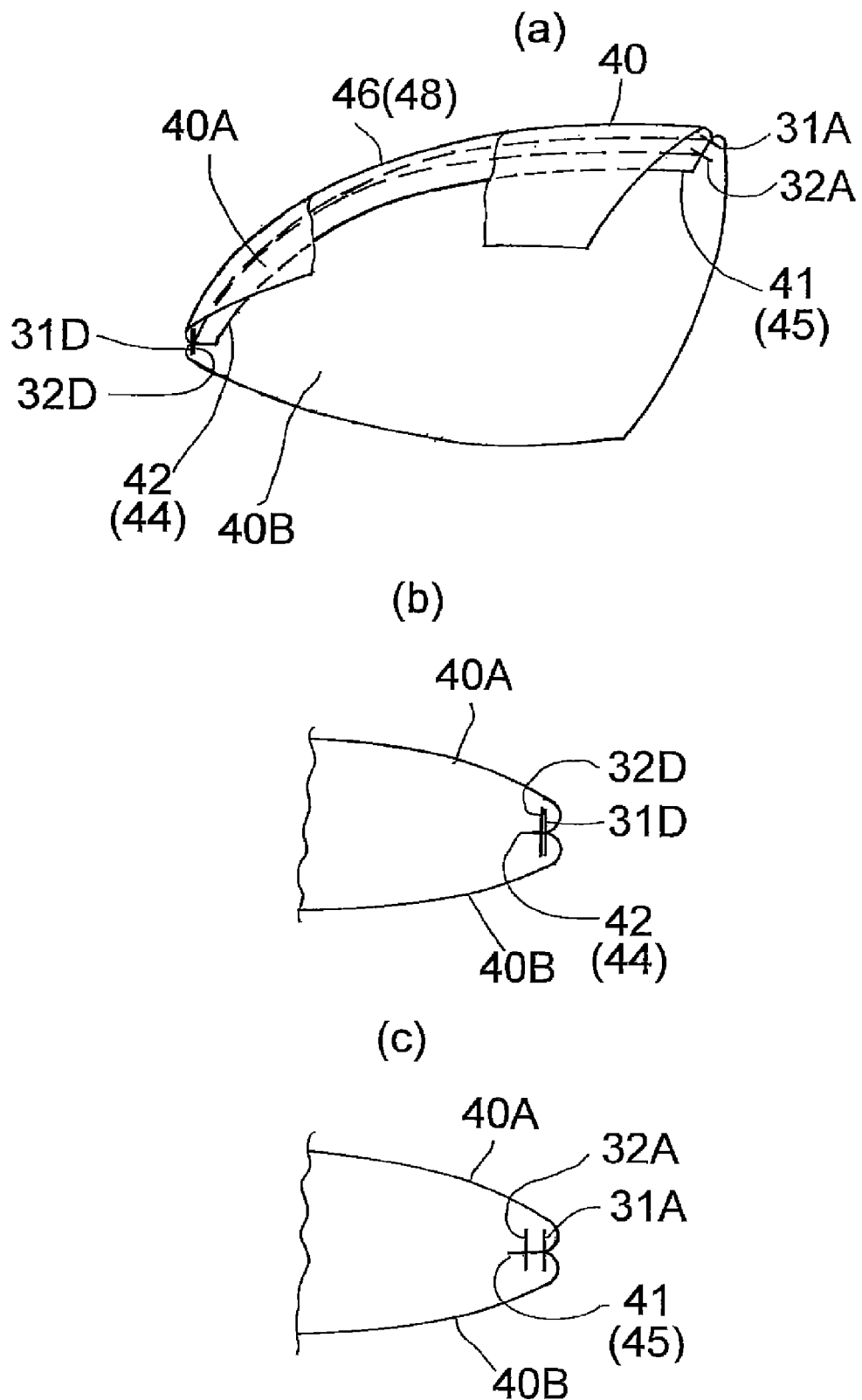
FIG. 10 is an explanatory diagram of primary components of the material to be sewn of FIG. 9, in which (a) is a cross-sectional view taken along line a-a, (b) is a cross-sectional view taken along line b-b, and (c) is a cross-sectional view taken along line c-c.

The material to be sewn 40 is overturned in use as illustrated in FIGS. 9 and 10, and the stitches 31A to 31E are positioned on the outer periphery of the material to be sewn 40, the stitches 32A to 32E are positioned inside the material to be sewn 40, and the right linear portion 41, the right curve part 42, the central curve part 43, the left curve part 44, and the left linear portion 45 are folded inside. Since the stitches 31D and 32D of the right convex portion 46 and the left convex portion 48 are closely overlap, these portions are reinforced and difficult to broaden and are not easily broken even if materials are filled in the right convex portion 46 and the left convex portion 48 and can be used for a long time. The central concave part 47 is slightly weak in strength than the right convex portion 46 and the left convex portion 47 because the stitches 31E and 32E are separated each other, but since the load applied to the central concave part 47 is not so large as applied to the right convex portion 46 and the left convex portion 48, the central concave part 47 may be used for a long time. Further, the right convex portion 46 and the left convex portion 48, the right curve part 42 and the left curve part 44 are overturn inside, but since the stitches 31D and 32D overlap with each other, an overturn amount of the right curve part 42 and the left curve part 44 is small, and as a result, the right curve part 42 and the left curve part 44 rarely become an obstacle at the time of filling the material therein, and as a result, the filled material may be closely received up to the vicinity of the stitches 31D and 32D.

Figure 17:
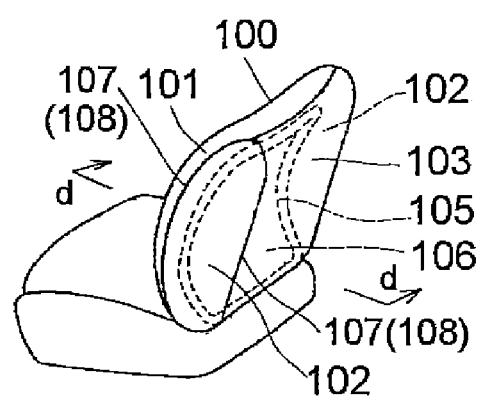
FIG. 17 is a perspective view illustrating a detailed example of a material to be sewn.
Figure 18:
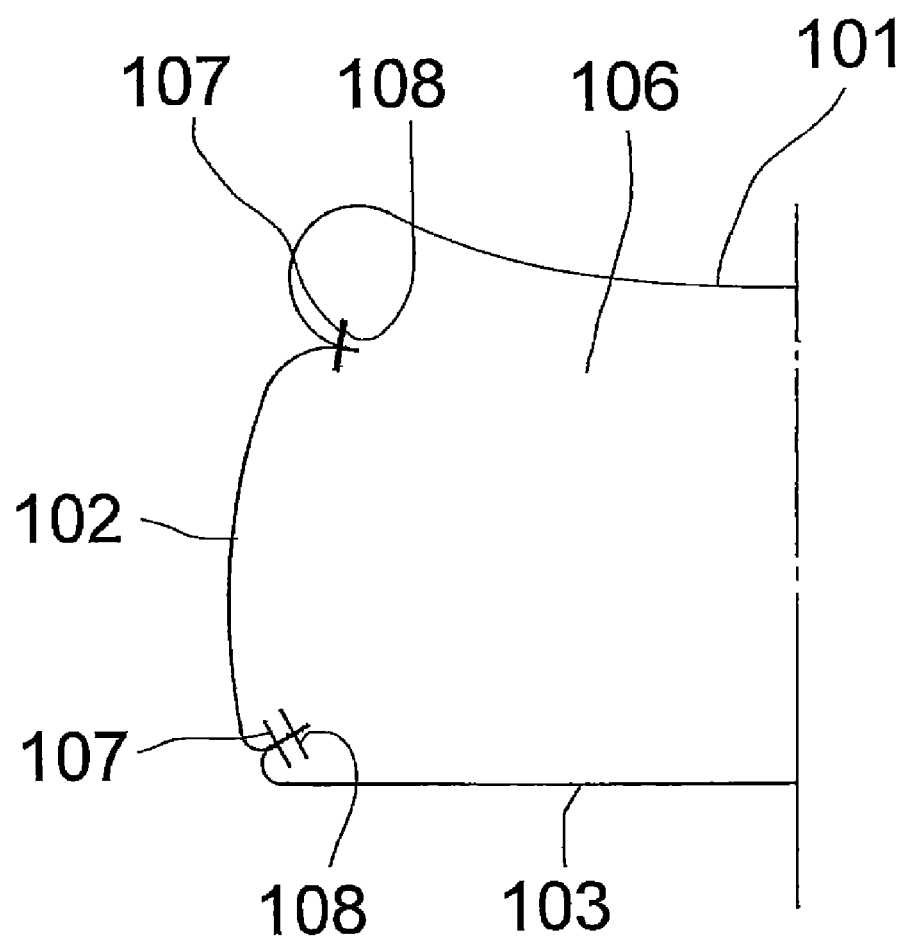
FIG. 18 is a cross-sectional view of primary components of FIG. 17 taken along line d-d.

A case in which the material to be sewn is the leather sheet of the vehicle seat will be described based on FIGS. 17 and 18. A sheet back 100 is constituted by a front sheet 101, side sheets 102 and 102, and a back sheet 103, and is filled with an interlining 105 and a pad 106 such as urethane foam, and the like therein. Since the front sheet 101 and the side sheet 102 are sewn in a curved pattern, the sewing is performed by the curved needlework, and since stitches 107 and 108 closely overlap with each other, the sewing is robust. Since the back sheet 103 and the side sheet 102 are sewn straightly, the sewing is performed by a straight needlework and the stitches 107 and 108 are separated each other. Very large force is applied to the front sheet 101 in order to support movement of a driver, but since the periphery of the front sheet 101 is reinforced by a lined needlework of the stitch, it is unlikely that the stitch will stretch or be broken, and as a result, the safety is secured and furthermore, it is unlikely that a part of the pad 106 is exposed, thereby damaging an appearance. So many pocket-shaped materials to be sewn, in general, are formed only by convex curve portions, and if the curved needlework is performed along the convex curve portions by the sewing machine 1, a pair of stitches which are close to each other always can be made, and thus robust sewing can be performed.

A two-needle sewing machine 61 illustrated in FIG. 19 will be described. In the two-needle sewing machine 61, sewing needles 71 and 72 are arranged at both sides substantially in the direction orthogonal to the conveyance direction T of the material to be sewn, the sewing needle 72 arranged at a position (left side) distant from a column part 65 is positioned at the back side (the back side of the conveyance direction T), and the sewing needle 71 arranged at the position (right side) closer to the column part 65 is positioned at the front side (the front side of the conveyance direction T), and as a result, the sewing needle 71 is provided at the conveyance side (front side) of the material to be sewn rather than the sewing needle 72. Meanwhile, as illustrated in FIG. 20, in the two-needle sewing machine 61, two stitches are formed substantially in parallel to each other by the sewing needles 71 and 72.

Figure 19:
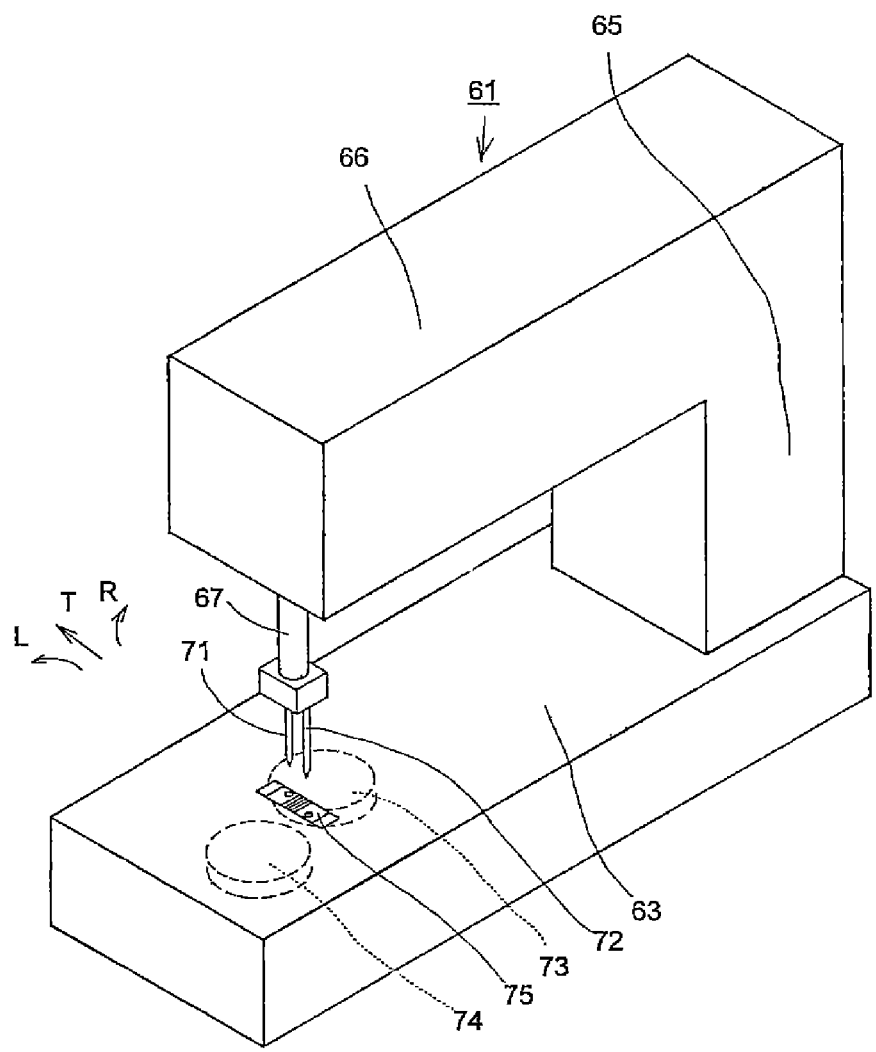
FIG. 19 is an overall perspective view illustrating another embodiment of the two-needle sewing machine.
Figure 20:
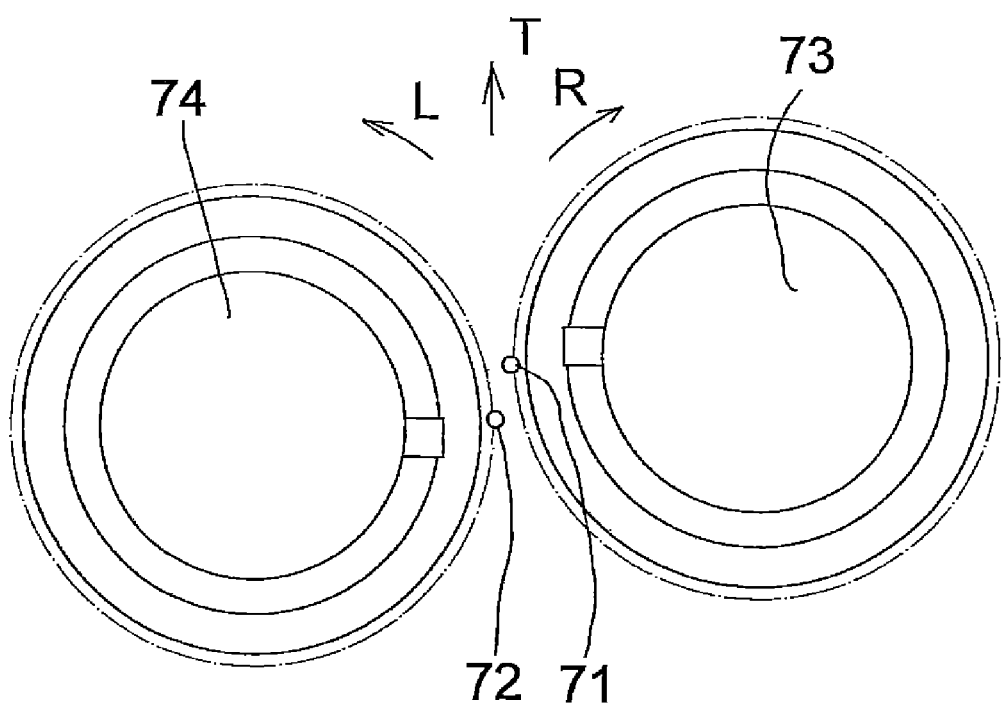
FIG. 20 is an explanatory diagram of primary components of the two-needle sewing machine of FIG. 19.

As illustrated in FIG. 19, the two-needle sewing machine 61 is constituted by a bed part 63 on which the materials to be sewn such as the cloth, the leather, and the like are placed, a column part 65 erected upward from one side (right side) of the bed part 63 to the upper side of the bed part 63, and an arm part 66 provided substantially in parallel to the bed part 63 from the upper side of the column part 65. A needle shaft 67 that reciprocates orthogonally by a driving motor (not illustrated) is provided at a leading part (left portion) of the arm part 66. Two sewing needles 71 and 72 are mounted on the needle shaft 67. The bed part 63 includes two horizontal hooks 73 and 74 that catch respective loops of needle threads of the two sewing needles 71 and 72 and a conveyor member 75 that conveys the material to be sewn in a direction approximately orthogonal to the bed part 63.

The sewing needles 71 and 72 are separated each other by approximately 3 mm or more based on the relationship of an outer diameter of the sewing needle itself and the arrangement of the horizontal hook, and the position of one sewing needle 71 and the position of the other sewing needle 72 deviate from each other in order to set the width of the stitch to approximately 0.3 mm. Therefore, a gap between the sewing needles 71 and 72 is separated each other as described above, but the gap between the sewing needles 71 and 72 in a direction approximately orthogonal to the sewing direction P1 (see FIG. 21) is narrowed, and as a result, the width of the stitch is narrowed.

In the two-needle sewing machine 61, the material to be sewn is intermittently conveyed to the front side by the conveyor member 75, but sewing is performed with the material to be sewn being pressed with both hands while visually verifying needlework positions of the sewing needles 71 and 72 so as to prevent a sewing failure due to deviation of the needlework positions of the material to be sewn. The sewing is performed while verifying a sewing position from the left side because the arm part 66 exists at the right side around the sewing needles 71 and 72. The material to be sewn is not sewn linearly at all times and the sewing may be performed in the curved pattern according to a shape thereof. In the case where the sewing is performed in the curved pattern, when sewing is performed by rotating the material to be sewn in the right direction (R direction) so that the material to be sewn is close to the column part 65 with respect to the conveyance direction T of the conveyor member 75, the stitch is not shown well by existence of the arm part 66, and as a result, the sewing failure, and the like may occur. Further, when the material to be sewn is rotated in the right direction (R direction), since the material to be sewn contacts the column part 65, it is difficult for an operator to perform sewing as intended. Therefore, in the two-needle sewing machine 61, when sewing is performed in a curved pattern, sewing is performed by rotating the material to be sewn in the left direction (L direction) so that the material to be sewn is distant from the column part 65 with respect to the conveyance direction T of the conveyor member 75.

Figure 21:
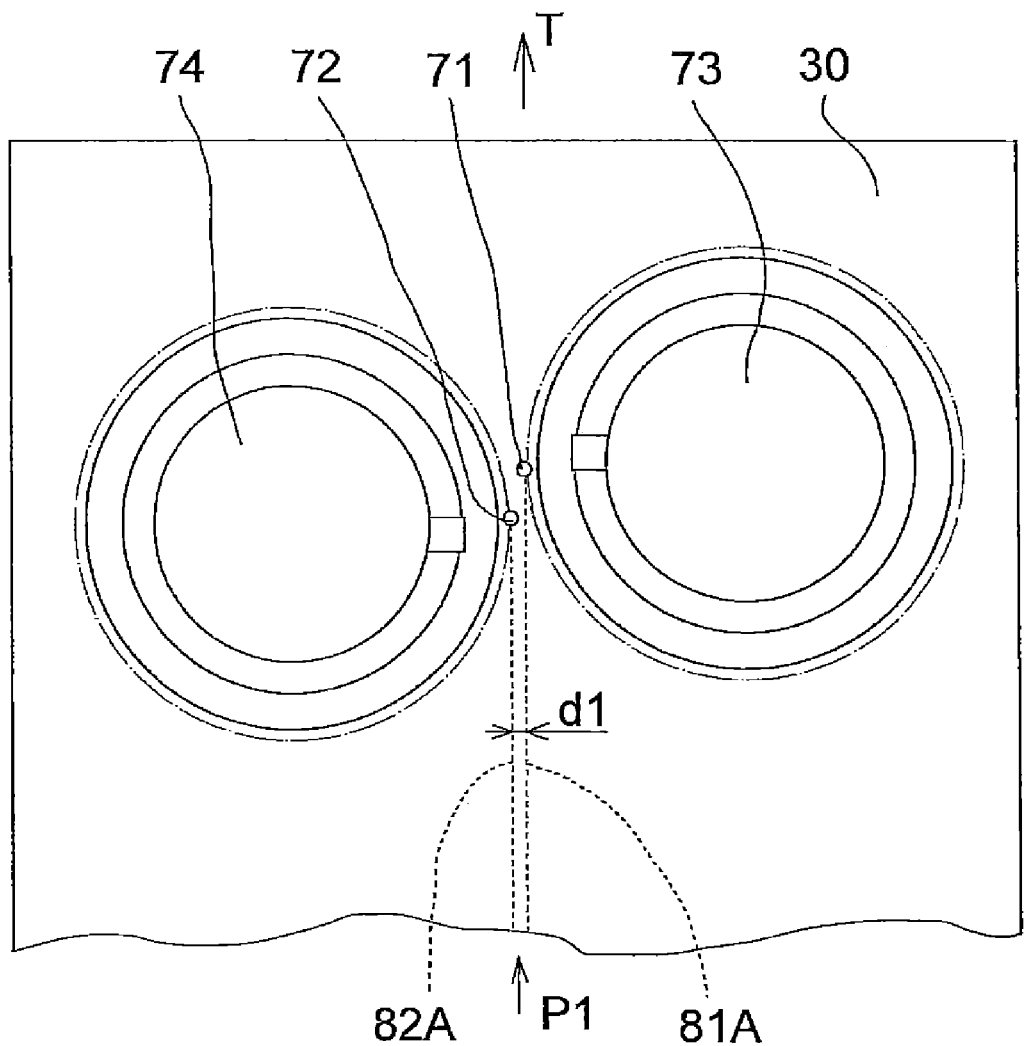
FIG. 21 is an explanatory diagram illustrating a common two-needle sewing machine stitch forming method of FIG. 19.
Figure 22:
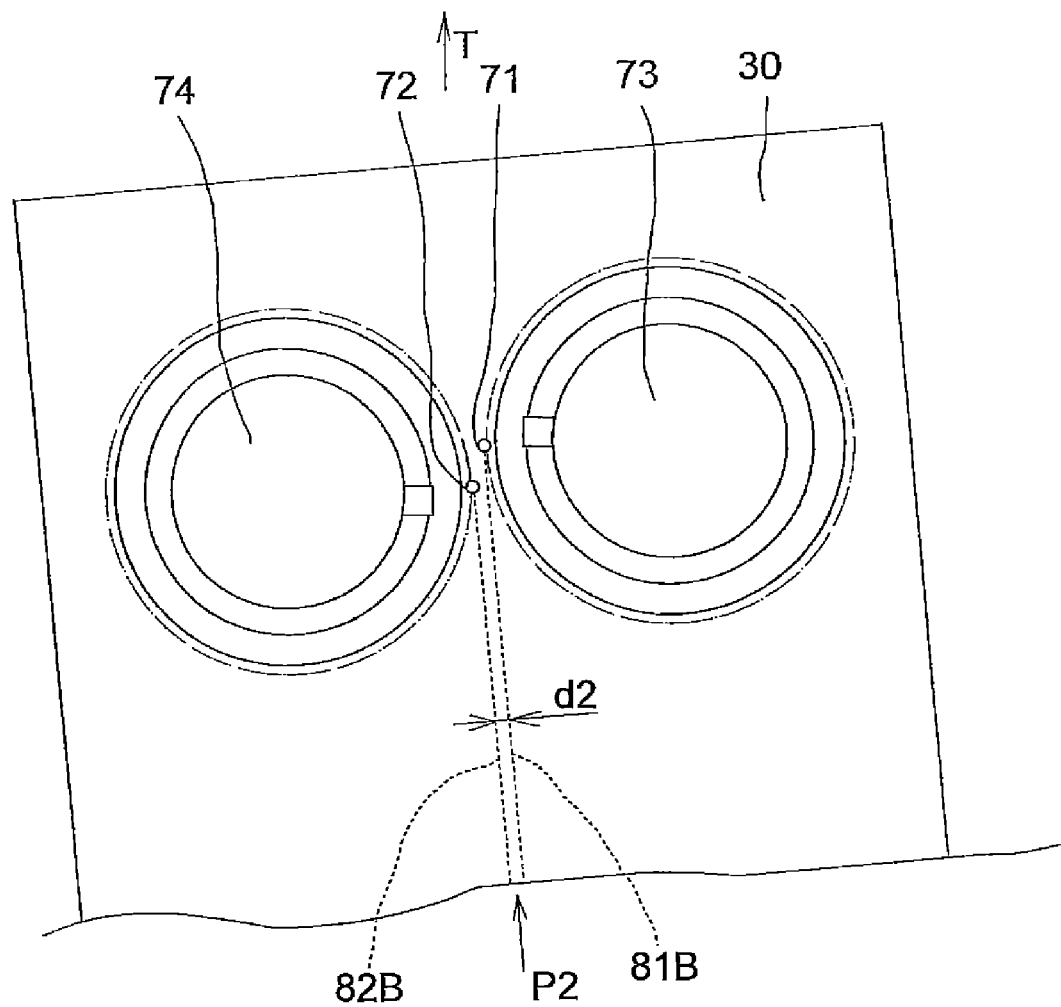
FIG. 22 is an explanatory diagram illustrating a method for forming an inclined stitch of the two-needle sewing machine of FIG. 19.

As illustrated in FIG. 21, in the two-needle sewing machine 61, since the material to be sewn 30 is conveyed in the sewing direction P1 substantially parallel to the conveyance direction T of the conveyor member 75, a pair of stitches 81A and 82A having a common stitch width d1 are formed by the pair of sewing needles 71 and 72. As illustrated in FIG. 22, in the two-needle sewing machine 61, the material to be sewn 30 is conveyed to be turned left in a sewing direction P2 (an inclination angle of approximately 5 degrees) distant from the column part 65 with respect to the conveyance direction T of the conveyor member 75, and as a result, the gap between the sewing needles 71 and 72 in the direction approximately orthogonal to the sewing direction P2 is further broadened to form a pair of stitches 81B and 82B having a stitch width d2 larger than the common stitch width d1 by the pair of sewing needles 71 and 72.

Figure 23:
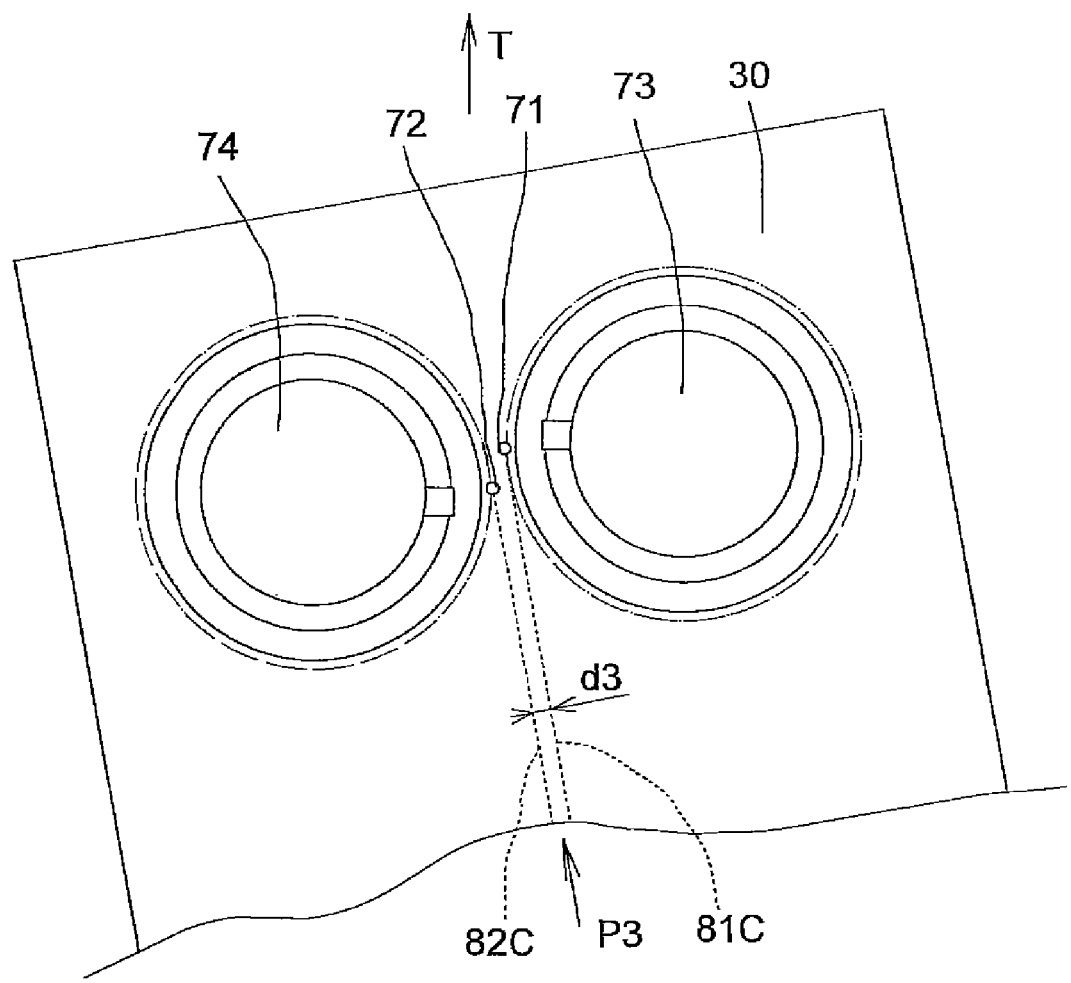
FIG. 23 is an explanatory diagram illustrating a method for forming an inclined stitch of the two-needle sewing machine of FIG. 19.
Figure 24:
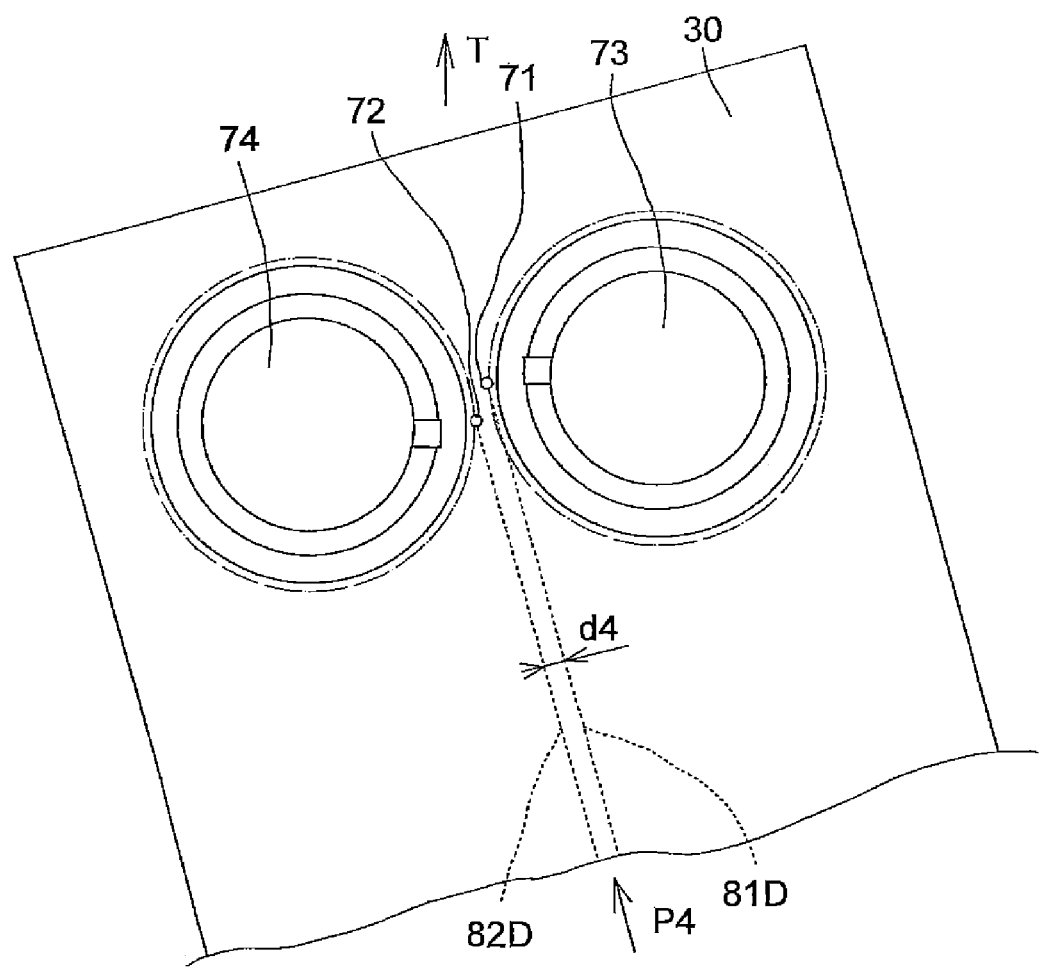
FIG. 24 is an explanatory diagram illustrating a method for forming an inclined stitch of the two-needle sewing machine of FIG. 19.

As illustrated in FIG. 23, in the two-needle sewing machine 61, the material to be sewn 30 is conveyed to be turned left in a P3 direction (at an inclination angle of approximately 10 degrees) distant from the column part 5 with respect to the conveyance direction T of the conveyor member 75, and as a result, the gap between the sewing needles 71 and 72 in the direction approximately orthogonal to the sewing direction P3 is further broadened to form a pair of stitches 81C and 82C having a stitch width d3 larger than the common stitch width d2 by the pair of sewing needles 71 and 72. As illustrated in FIG. 24, in the two-needle sewing machine 61, the material to be sewn 30 is conveyed to be turned left in a P4 direction (at an inclination angle of approximately 15 degrees) distant from the column part 5 with respect to the conveyance direction T of the conveyor member 75, and as a result, the gap between the sewing needles 71 and 72 in the direction approximately orthogonal to the sewing direction P4 is further broadened to form a pair of stitches 81D and 82D having a stitch width d4 larger than the stitch width d3 by the pair of sewing needles 71 and 72. Like this, in the two-needle sewing machine 61, as a left-turn angle of the material to be sewn 30 is larger, the stitch width is broadened.

Figure 25:
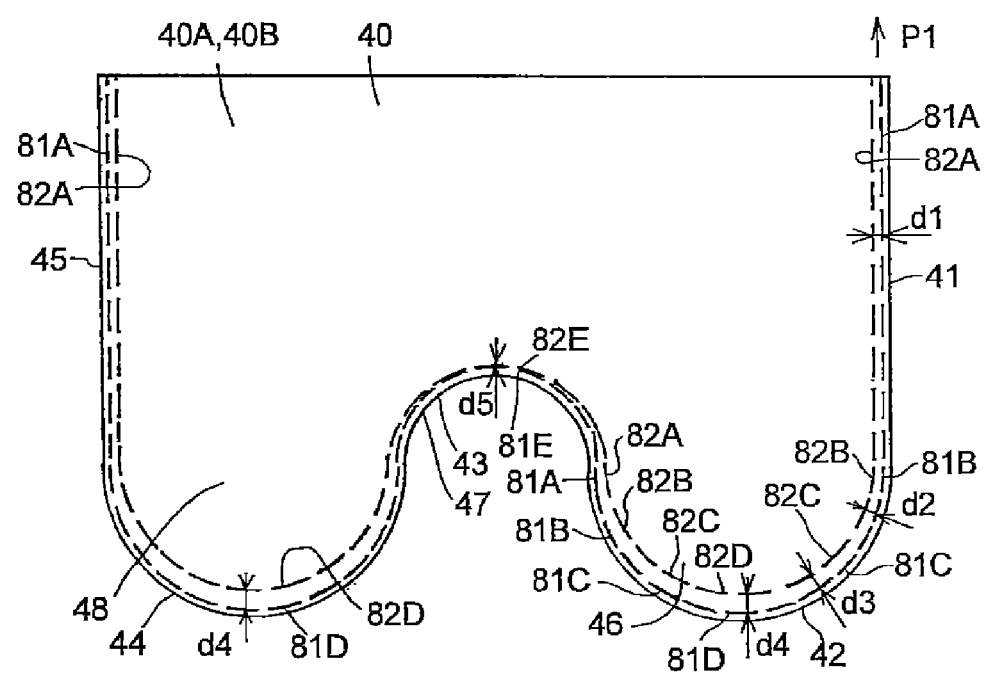
FIG. 25 is an explanatory diagram of a material to be sewn which is sewn by the two-needle sewing machine of FIG. 19.
Figure 26:
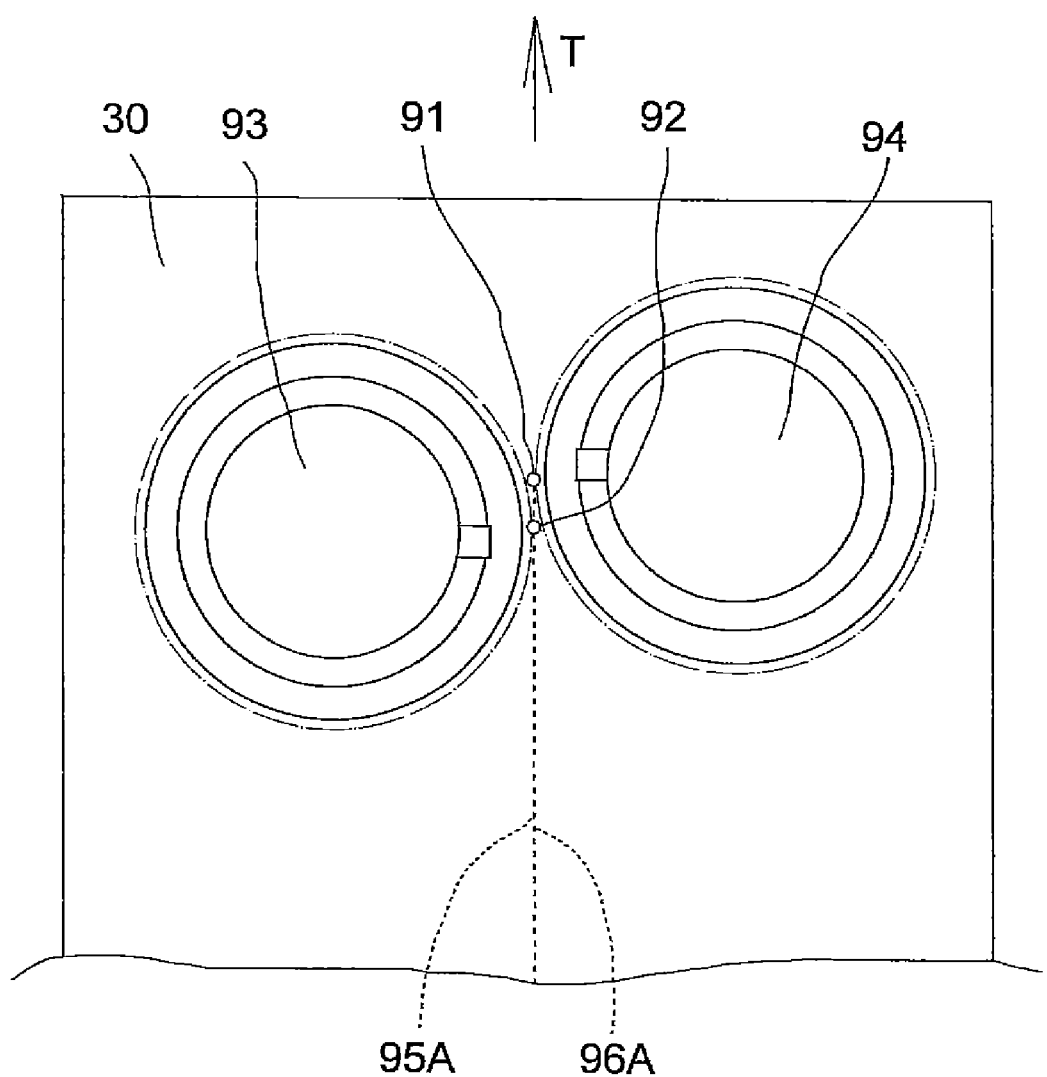
FIG. 26 is an explanatory diagram illustrating a common two-needle sewing machine stitch forming method in the conventional art.
Figure 27:
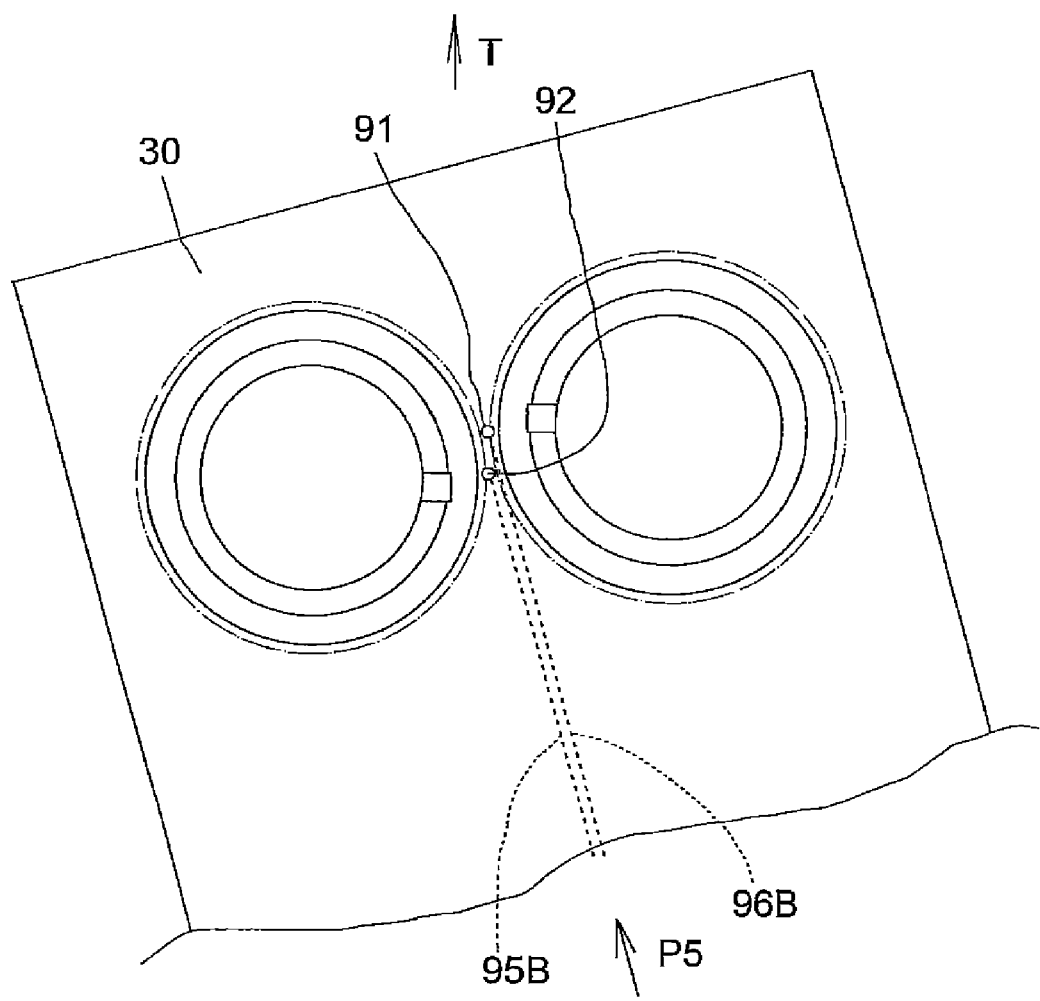
FIG. 27 is an explanatory diagram illustrating a method for forming an inclined stitch of the two-needle sewing machine in the conventional art.
Figure 28:
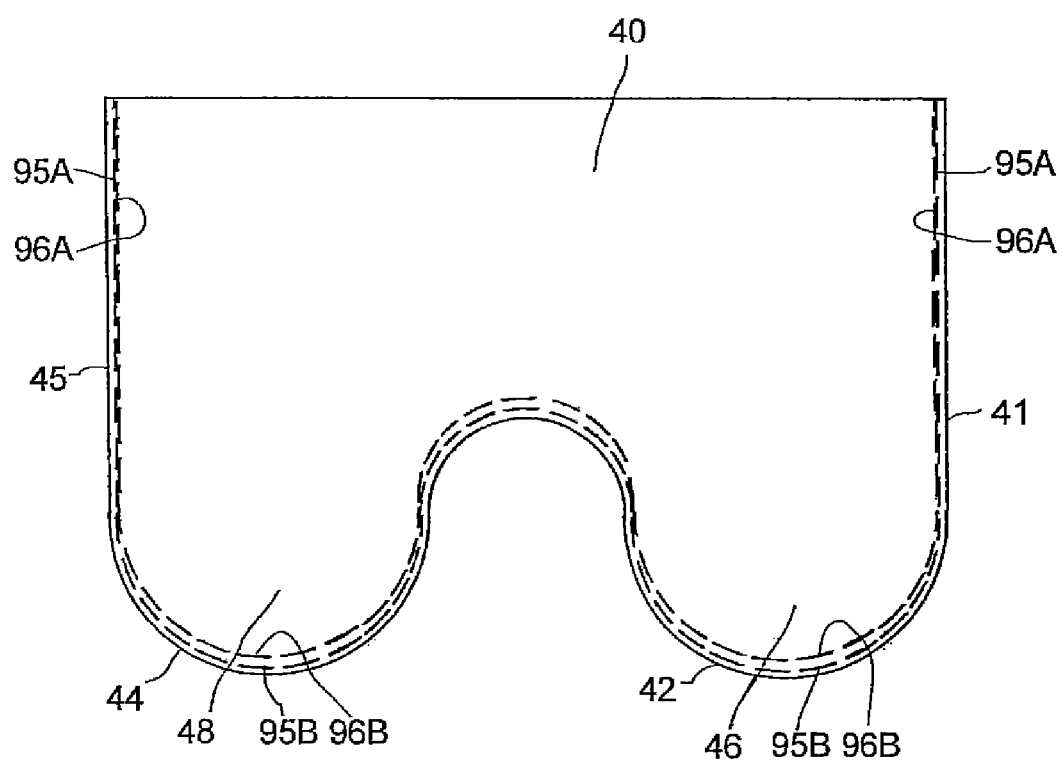
FIG. 28 is an explanatory diagram of a material to be sewn which is sewn by the two-needle sewing machine in the conventional art.

As illustrated in FIG. 25, the aforementioned pocket-shaped material to be sewn 40 is sewn by the two-needle sewing machine 61. Sewing is performed substantially in parallel along the right linear portion 41 of the material to be sewn 40 in which the pair of sheet members 40A and 40A overlap with each other by the two-needle sewing machine 61. In the two-needle sewing machine 61, since the material to be sewn 40 is conveyed in the P1 direction substantially parallel to the conveyance direction T of the conveyor member 75, the pair of stitches 81A and 82A having the common stitch width d1 are formed by the pair of sewing needles 71 and 72. In the two-needle sewing machine 61, when sewing is performed along the right curve part 42, since the material to be sewn 40 is inclined and conveyed in a direction (left direction L) distant from the column part 65 with respect to the conveyance direction T of the conveyor member 75, the stitches 81D and 82D in which the stitch width d4 formed by the pair of sewing needles 71 and 72 is larger than the common stitch width d1 are formed.

In the two-needle sewing machine 61, when sewing is performed along the central curve part 43 from the right curve part 42, since the material to be sewn 40 is inclined and conveyed in a direction (right direction R) close to the column part 65 with respect to the conveyance direction T of the conveyor member 75, a stitch width d5 formed by the pair of sewing needles 71 and 72 is narrowed, and as a result, stitches 81E and 82E which overlap with each other are formed. In the two-needle sewing machine 61, when sewing is performed along the left curve part 44 from the central curve part 43, since the material to be sewn 40 is inclined and conveyed in the direction (left direction L) distant from the column part 65 with respect to the conveyance direction T of the conveyor member 75, the stitches 81D and 82D in which the stitch width d4 formed by the pair of sewing needles 71 and 72 is broadened are formed. In the two-needle sewing machine 61, when sewing is performed along the left linear portion 45 from the left curve part 44, since the material to be sewn 40 is inclined and conveyed in a direction close to the column part 65 with respect to the conveyance direction T of the conveyor member 75, the pair of stitches 81A and 82A having the common stitch width d1 are formed by the pair of sewing needles 71 and 72.

In the material to be sewn 40, the stitch widths d4 of the stitches 81D and 82D that sew the peripheries of the convex portions 46 and 48 are broadened the stitch widths d5 of the stitches 81E and 82E that sew the periphery of the concave part 47 overlap with each other. When the material to be sewn 40 is filled with material, in general, since force applied to the convex portions 46 and 48 is large, the gap between the stitches 81D and 82D is broadened and strength is short, and as a result, the stitches 81D and 82D are easily broken. Therefore, in the two-needle sewing machine 61, when the material to be sewn 40 having the convex portions 46 and 48 is sewn, the widths d4 of the stitches 81D and 82D that sew the peripheries of the convex portions 46 and 48 are broadened, and thus strength is short and when the filled materials are received in the convex portions 46 and 48, the stitches 81D and 82D are easily broadened and easily broken, and thus durability is short. Like this, in the two-needle sewing machine 61, the width of the stitch is broadened in the curved needlework, and as a result, strength is short, unlike the two-needle sewing machine 1. Therefore, it can be understood that the two-needle sewing machine 61 is not preferably configured. Accordingly, it is preferable that in the two-needle sewing machine, the sewing needle arranged at the position distant from the column part is provided at the conveyance side of the material to be sewn rather than the sewing needle arranged at the position closer to the column part.

INDUSTRIAL APPLICABILITY

The present invention can be used in the two-needle sewing machine that forms two stitches in the material to be sewn.

REFERENCE SIGNS LIST

D1 Stitch width
D2 Stitch width
D3 Stitch width
D4 Stitch width
D5 Stitch width
L Left direction
P Sewing direction (sewing direction)
P1 Stitch direction
P2 Stitch direction
P3 Stitch direction
P4 Stitch direction
P5 Stitch direction
R Right direction
T Conveyance direction
1 Two-needle sewing machine
2 Sewing machine body
3 Bed part
5 Column part
6 Arm part
11 Needle shaft
12 Needle supporting member
13 Sewing needle
14 Sewing needle
15 Horizontal hook
16 Horizontal hook
21 Downward conveyor member
30 Material to be sewn
31 Stitch
31A-31E Stitch
32 Stitch
32A-32E Stitch
40 Material to be sewn
40A Sheet
40B Sheet
41 Right linear portion
42 Right curve portion
43 Central curve portion
44 Left curve portion
45 Left linear portion
46 Right convex portion
47 Central concave part
48 Left convex portion
61 Two-needle sewing machine
63 Bed part
65 Column part
66 Arm part
67 Needle shaft
71 Sewing needle
72 Sewing needle
73 Horizontal hook
74 Horizontal hook
75 Conveyor member
81 Stitch
81A-81E Stitch
82 Stitch
82A-82E Stitch
91 Sewing needle
92 Sewing needle
93 Horizontal hook
94 Horizontal hook
95 Stitch
96 Stitch
100 Sheet back
101 Front sheet
102 Side sheet
103 Back sheet
105 Interlining
106 Pad
107 Stitch
108 Stitch

The invention claimed is:

1. A two-needle sewing machine, comprising:
   a bed part on which a material to be sewn is placed;
   a column part erected upward from one side of the bed part;
   an arm part provided substantially parallel to the bed part at an upper portion of the column part;
   a needle shaft provided at a leading part of the arm part to reciprocate vertically by a driving motor;
   two sewing needles mounted on the needle shaft;
   two horizontal hooks provided in the bed part and catch respective loops of needle threads of the two sewing needles; and
   a conveyor member that conveys the material to be sewn in a direction approximately orthogonal to the bed part,
   wherein the sewing needles are arranged at both sides of a direction approximately orthogonal to a conveyance direction of the material to be sewn and a first sewing needle of the sewing needles arranged at a position distant from the column part is provided at a conveyance side of the material to be sewn rather than a second sewing needle of the sewing needles arranged at a position closer to the column part.

2. A method for forming a stitch of a two-needle sewing machine including:
   a bed part on which a material to be sewn is placed;
   a column part erected upward from one side of the bed part;
   an arm part provided substantially parallel to the bed part at an upper portion of the column part;
   a needle shaft provided at a leading part of the arm part to reciprocate vertically by a driving motor;
   two sewing needles mounted on the needle shaft;
   two horizontal hooks provided in the bed part and catch respective loops of needle threads of the two sewing needles; and
   a conveyor member that conveys the material to be sewn in a direction approximately orthogonal to the bed part, the sewing needles are arranged at both sides of a direction approximately orthogonal to a conveyance direction of the material to be sewn and a first sewing needle of the sewing needles arranged at a position distant from the column part is provided at a conveyance side of the material to be sewn rather than a second sewing needle of the sewing needles arranged at a position closer to the column part, the method comprising:

forming a pair of stitches having a common stitch width by the sewing needles by conveying the material to be sewn in a conveyance direction of the conveyor member; and forming a pair of stitches having a stitch width smaller than the common stitch width by the sewing needles by conveying the material to be sewn in a direction distant from the column part with respect to the conveyance direction of the conveyor member.

3. A method for forming a stitch on the periphery of a material to be sewn having a convex part by a two-needle sewing machine including:

a bed part on which a material to be sewn is placed;

a column part erected upward from one side of the bed part;

an arm part provided substantially parallel to the bed part at an upper portion of the column part;

a needle shaft provided at a leading part of the arm part to reciprocate vertically by a driving motor;

two sewing needles mounted on the needle shaft;

two horizontal hooks that are provided in the bed part and catch respective loops of needle threads of two sewing needles; and a conveyor member that conveys the material to be sewn in a direction approximately orthogonal to the bed part, wherein the sewing needles are arranged at both sides of a direction approximately orthogonal to a conveyance direction of the material to be sewn and a first sewing needle of the sewing needles arranged at a position distant from the column part is provided at a conveyance side of the material to be sewn rather than a second sewing needle of the sewing needles arranged at a position closer to the column part, the method comprising:

forming a pair of stitches having a common stitch width by the sewing needles by conveying the material to be sewn in a conveyance direction of the conveyor member; and forming a pair of stitches having a stitch width smaller than the common stitch width on the periphery of a convex portion by the sewing needles by conveying the material to be sewn in a direction distant from the column part with respect to the conveyance direction of the conveyor member.

* * * * *